US008090324B2

(12) United States Patent
Kusakari

(10) Patent No.: US 8,090,324 B2
(45) Date of Patent: Jan. 3, 2012

(54) RADIO COMMUNICATION TERMINAL APPARATUS, DISPLAY METHOD IN RADIO COMMUNICATION TERMINAL APPARATUS AND RADIO COMMUNICATION NETWORK SYSTEM

(75) Inventor: Shin Kusakari, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 653 days.

(21) Appl. No.: 12/027,562

(22) Filed: Feb. 7, 2008

(65) Prior Publication Data

US 2008/0194205 A1    Aug. 14, 2008

(30) Foreign Application Priority Data

Feb. 13, 2007  (JP) ................................. 2007-032104
Nov. 27, 2007  (JP) ................................. 2007-306420

(51) Int. Cl.
*H04B 17/00* (2006.01)

(52) U.S. Cl. ..................................... 455/67.7; 455/41.3

(58) Field of Classification Search ................. 455/67.7, 455/67.11, 6.1, 41.2, 41.3, 63.1
See application file for complete search history.

(56) References Cited

U.S. PATENT DOCUMENTS

| | | | | |
|---|---|---|---|---|
| 2004/0137855 A1* | 7/2004 | Wiley et al. | ...................... | 455/88 |
| 2004/0162076 A1* | 8/2004 | Chowdry et al. | ............. | 455/445 |
| 2006/0041615 A1* | 2/2006 | Blank et al. | ................... | 709/204 |
| 2009/0013057 A1* | 1/2009 | Suzuki | ......................... | 709/217 |

FOREIGN PATENT DOCUMENTS

| | | |
|---|---|---|
| JP | 2004-112225 | 4/2004 |
| JP | 2004-328269 | 11/2004 |

\* cited by examiner

*Primary Examiner* — Lewis West
(74) *Attorney, Agent, or Firm* — Oblon, Spivak, McClelland, Maier & Neustadt, L.L.P.

(57) ABSTRACT

A radio communication terminal apparatus has a measuring part configured to measure radio field intensities of radio communication with other plurality of radio communication terminal apparatuses of a plurality of radio communication terminal apparatuses; a storing part configured to store measurement values of radio field intensities of radio communication with the other plurality of radio communication terminal apparatuses, obtained from the measurement of the measuring part; and a display screen for displaying the other plurality of radio communication terminal apparatuses to a user, wherein, on the display screen, identification information of the other plurality of radio communication terminal apparatuses is arranged in an increasing order or a decreasing order with the use of the measurement values of the radio field intensities of radio communication with the other plurality of radio communication terminal apparatuses stored by the storing part as a key for the arrangement.

18 Claims, 14 Drawing Sheets

RADIO COMMUNICATION TERMINAL APPARATUS, DISPLAY METHOD IN RADIO COMMUNICATION TERMINAL APPARATUS AND RADIO COMMUNICATION NETWORK SYSTEM

BACKGROUND OF THE INVENTION

1. Field of the Invention

The present invention relates to a radio communication network system having a plurality of radio communication terminal apparatuses having radio communication functions.

2. Description of the Related Art

Recently, a radio communication network system having a plurality of radio communication terminal apparatuses having radio communication functions is put into practical use. In such a radio communication network system, a user dose not need to connect a signal cable or such each time when a screen direction device (for example, a so-called 'mouse'), a printer apparatus or such, each having a radio communication function, is connected to a notebook-type personal computer apparatus of the user, for example. As a result, it is possible to build a system having large flexibility, which is thus convenience to the user.

Japanese Laid-Open Patent Application 2004-328269 discloses the related art, for example.

However, in such a system in the related art, when a radio communication network is used to connect a plurality of radio communication terminal apparatuses which are provided within a mutually radio accessible range, a case is assumed in which one radio communication terminal apparatus detects a plurality of accessible radio communication terminal apparatuses, which are then displayed on a display screen of the one radio communication terminal apparatus to a user thereof. In such a case, it may be difficult to obtain correspondence between unique information of the plurality of communication terminal apparatuses thus displayed and the actual plurality of radio communication terminal apparatuses. As a result, it may be difficult to understand which of the thus-displayed plurality of radio communication terminal apparatuses should be selected.

Specifically, for example, in a case where a user works on a notebook-type personal computer apparatus (which may be simply referred to as a PC, hereinafter) which is brought into another office belonging to the same company, or another floor, when the user operates the notebook-type PC to print out a document with the use of a printer apparatus which is provided in the another office or the another floor, and is connected by means of a radio communication network, the user should select a printer apparatus which the user actually use for printing out the document therewith.

In such a case, when a plurality of candidates of printer apparatuses are displayed on a display screen of the notebook-type PC for example, the user may not easily understand which printer apparatus among these candidates should be selected in a view point of obtaining a printed document fastest.

Further, in this case, it may be difficult for the user to determine which one of the printer apparatuses provided in the another office or floor corresponds to certain one of the candidates of printer apparatuses displayed on the screen of the notebook-type PC.

Further, among the well-known peer-to-peer communication standards, there is a communication standard in which, when one radio communication terminal apparatus of a plurality of radio communication terminal apparatuses is already used by another user, this one radio communication terminal apparatus cannot be further used by another user. In such a communication standard, when once one radio communication terminal apparatus has been connected by another user via a radio communication network, this connection via the radio communication network cannot be disconnected unless one of these two radio communication terminal apparatuses which are thus mutually connected via the radio communication network is removed out of the mutual radio accessible range, the power supply thereof is broken, or the connection is intentionally disconnected. Thus, the connection to the specific radio communication terminal apparatus via the communication network may be exclusively used.

The present invention has been devised in consideration of such a situation, and an object of the present invention is to provide a convenient radio communication network system.

SUMMARY OF THE INVENTION

According to the present invention, in a radio communication network system having a plurality of radio communication terminal apparatuses having radio communication functions, one radio communication terminal apparatus measures radio field intensities of radio communication between the one radio communication terminal apparatus and the other radio communication terminal apparatuses, and, when a connection request for connection by the radio communication network to any one of the other radio communication terminal apparatuses arises, the other radio communication terminal apparatuses are displayed on a screen of the one radio communication terminal apparatus in such a manner that, measurement values of the radio field intensities thus stored are used as keys, and the other radio communication terminal apparatuses are arranged in an increasing order or a decreasing order according to the measurement values.

Further, the other radio communication terminal apparatuses thus displayed on the screen are displayed in such a manner as being classified according to respective types of the other radio communication terminal apparatuses, and, after that, the measurement values of the radio field intensities are used as keys and the other radio communication terminal apparatuses are arranged in an increasing order or a decreasing order according to the measurement values.

According to the present invention, when connecting with the other radio communication terminal apparatuses via the radio communication network, a display order of candidates of connection counterparts, i.e., the other radio communication terminal apparatuses, are automatically determined according to the respective radio field intensities. As a result, when a user operates the one radio communication terminal apparatus to select any one of the other radio communication terminal apparatuses, the user can easily determine which of the other radio communication terminal apparatuses should be selected.

It is noted that, it can be assumed that, as the radio field intensity of the radio communication terminal apparatus is higher, the radio communication terminal apparatus is located nearer.

As a result, in the case where the display order of the candidates of the connection counterparts is thus automatically determined according to their radio field intensities, even when the radio communication terminal apparatus having the highest radio field intensity is already used by another user, it is possible to easily determine which radio communication terminal apparatus of the remaining radio communication terminal apparatuses has the second highest radio field intensity, which should be located second nearest, to select to actually use for printing out a document via the radio communication network.

Further, in order to make it possible to easily recognize where the thus-selected radio communication terminal apparatus is physically located, it is preferable that the selected radio communication terminal apparatus visually or audibly responds to this selection. Such a configuration is especially more advantageous in a situation such that, as described above in '2. Description of the Related Art', the user temporarily works in the another office or floor of the same company.

Other objects, features and advantages of the present invention will become more apparent from the following detailed description when read in conjunction with the accompanying drawings.

DETAILED DESCRIPTION OF THE PREFERRED EMBODIMENTS

Below, embodiments of the present invention will be described with reference to the accompanying drawings.

Figure 1:
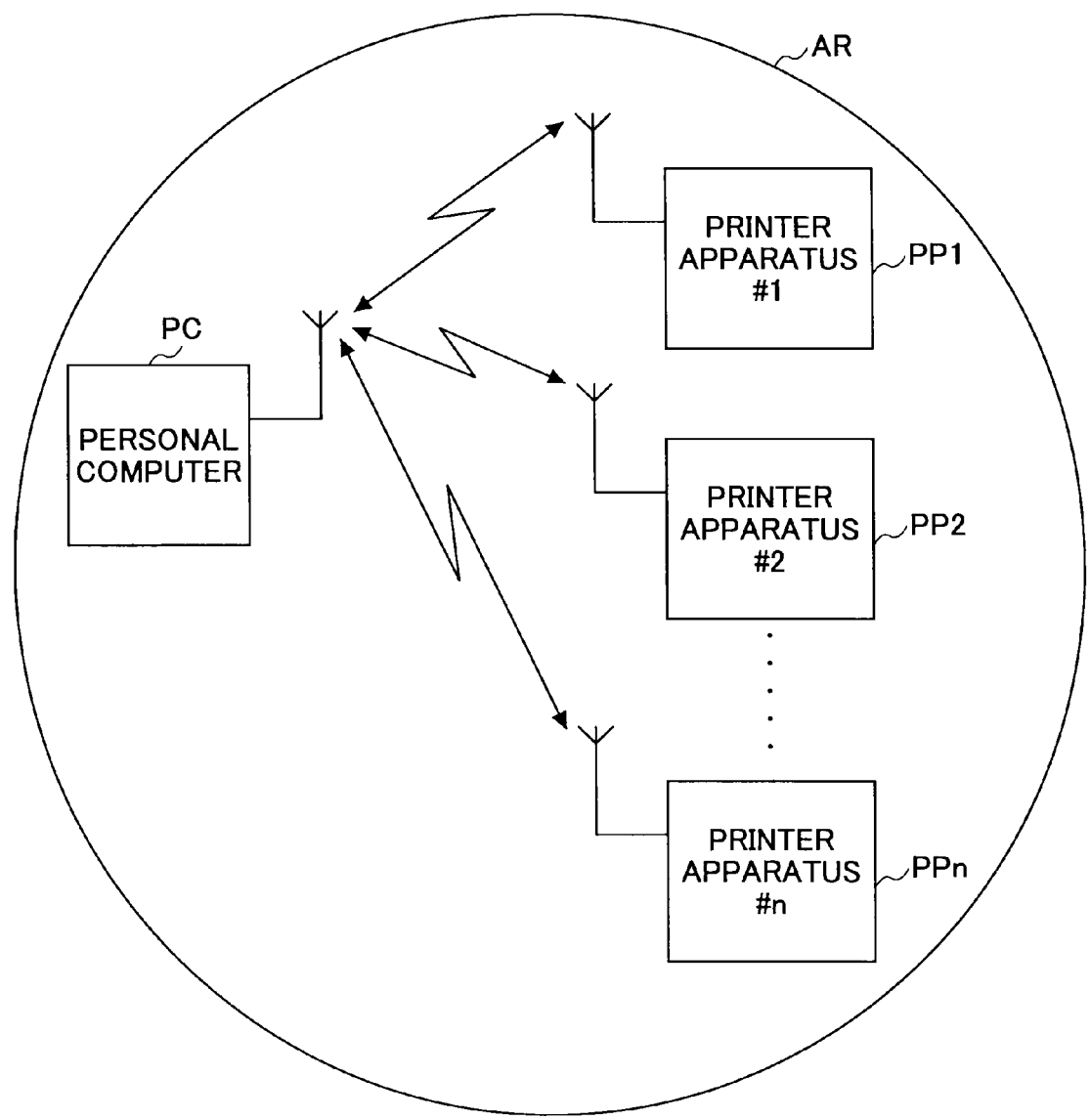
FIG. 1 shows a block diagram illustrating one example of a radio communication network system in one embodiment of the present invention.

FIG. 1 shows one example of a radio communication network system in a first embodiment of the present invention.

This radio communication network system includes, each acting as a radio communication terminal apparatus, one personal computer apparatus PC, and a plurality of printer apparatuses PP1 through PPn, which are connected together with the use of a radio local area network (i.e., radio LAN). In this case, all the printer apparatuses PP1 through PPn are located within an area AR (radio accessible range) in which a radio LAN adapter (described later) of the personal computer apparatus PC can communicate therewith.

As the radio LAN, a communication system prescribed by IEEE 802.11a/b/g is applied. An adhoc mode (i.e., a communication mode in a peer-to-peer type) is applied to a communication mode between the personal computer apparatus PC and the printer apparatuses PP1 through PPn.

Figure 2:
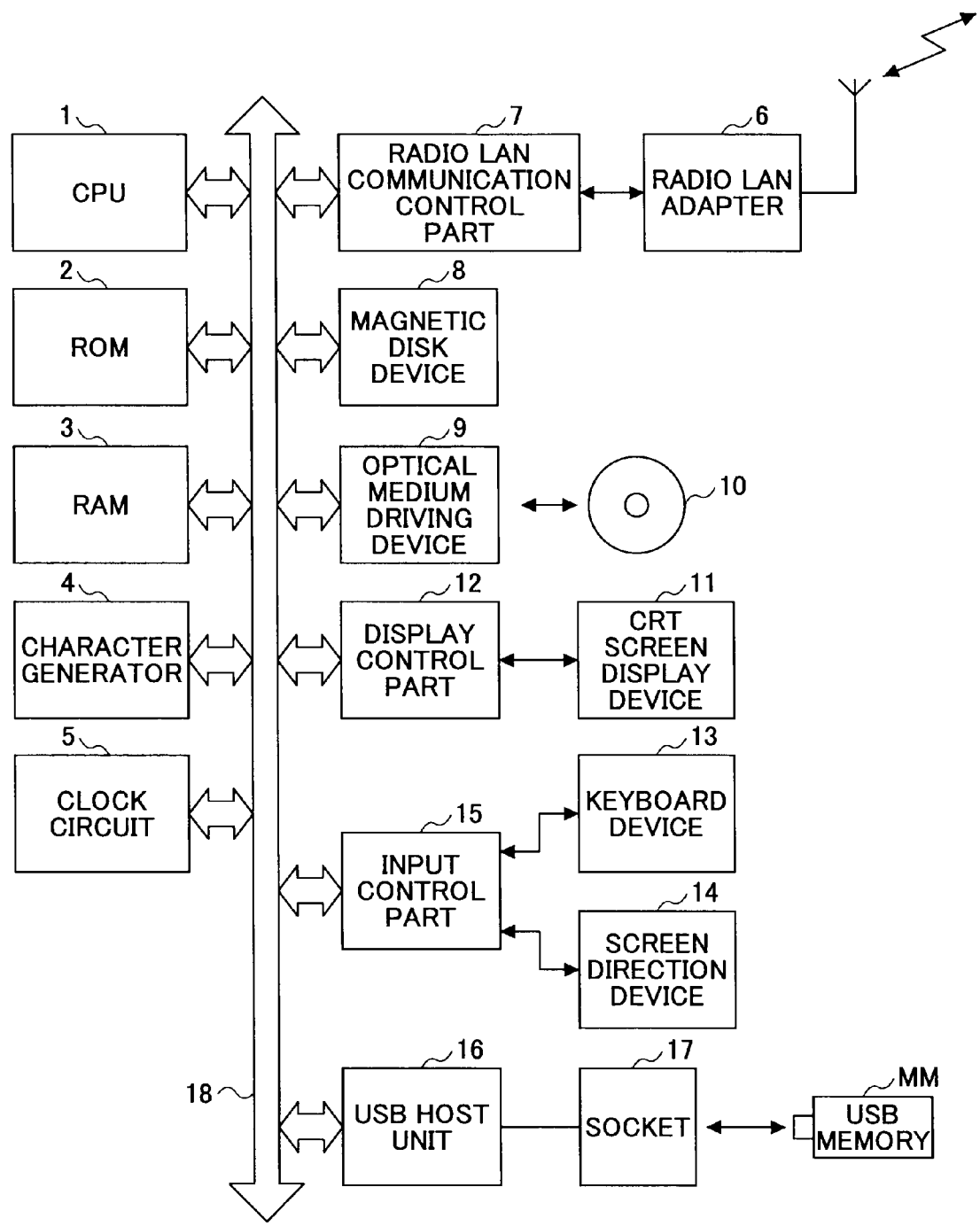
FIG. 2 shows a block diagram illustrating one example of a configuration of a personal computer apparatus PC.

FIG. 2 shows one example of a configuration of the personal computer apparatus PC.

As shown, the personal computer apparatus PC includes a CPU 1, a ROM 2, a RAM 3, a character generator 4, a clock circuit 5, a radio LAN communication control part 7, the above-mentioned radio LAN adapter 6, a magnetic disk device 8, an optical medium driving device 9, a display control part 12, a CRT screen display device 11, an input control part 15, a keyboard device 13, a screen direction device 14, a USB host unit 16 and a socket 17.

The CPU (central processing unit) 1 controls operation of the personal computer apparatus PC, the ROM (read only memory) 2 stores a program which the CPU 1 executes upon starting up, necessary data and so forth, the RAM (random access memory) 3 provides a work area for the CPU 1.

The character generator 4 generates display data such as figures, characters and so forth, the clock circuit 5 outputs current date/time information and also provides a function as a timer described later, the radio LAN adapter 6 establishes a radio LAN with the other radio communication terminal apparatuses, the radio LAN communication control part 7 executes communication control processing of various protocol suites for communication of various data with the other radio communication terminal apparatuses.

The magnetic disk device 8 stores various application programs, and various data such as work data, file data, a secret key used for deciphering an enciphered document in a public enciphering system, image information, and so forth, the optical medium driving device 9 accesses (reads/writes) a removable optical medium 10 (for example, a CD-ROM, a DVD or such), the CRT screen display device 11 displays a page for a user to operate the personal computer apparatus PC, and the display control part 12 controls display contents of the CRT screen display device 11.

The keyboard device 13 is provided for the user to carry out various sorts of key operation to the personal computer apparatus PC, the screen direction device 14 (i.e., a mouse or such) is used by the user to carry out operation such as that to direct any point on the screen of the screen display device 11, and the input control part 15 is used for taking input information provided by means of the keyboard device 13 or the screen direction device 14.

The USB host unit 16 is used to provide a USB host function, and has the socket 17 for inserting a USB memory MM.

The CPU 1, the ROM 2, the RAM 3, the character generator 4, the clock circuit 5, the radio LAN communication control part, the magnetic disk device 8, the optical medium driving device 9, the display control part 12, the input control part 15 and the USB host unit 16 are connected to an internal bus 18. Communication among these respective elements is carried out mainly by means of the internal bus 18.

Figure 3:
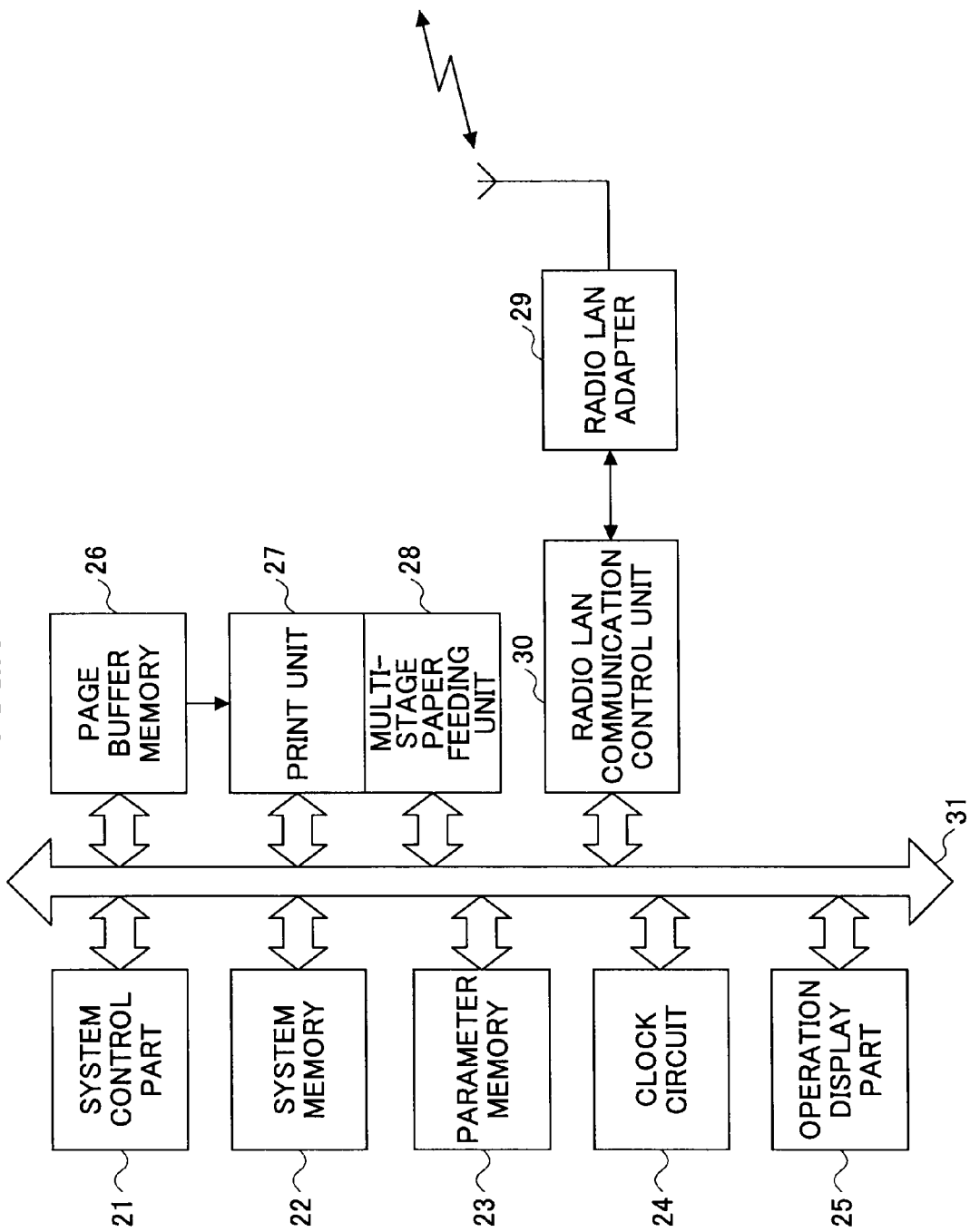
FIG. 3 shows a block diagram illustrating one example of a configuration of a printer apparatus PP (i.e., PP1 through PPn)

FIG. 3 shows one example of a configuration of the printer apparatus PP (i.e., each of the printer apparatuses PP1 through PPn). In this case, the printer apparatus PP has a multi-stage paper feeding unit having a plurality of trays each containing paper.

The printer apparatus PP shown in FIG. 3 includes a system control part 21, a system memory 22, a parameter memory 23, a clock circuit 24, an operation display part 25, a page buffer memory 26, a print unit 27, the above-mentioned multi-stage paper feeding unit 28, a radio LAN communication control part 27, and a radio LAN adapter 29.

The system control part 21 controls of operation of each part of this printer apparatus PP, paper feeding control, printing control, communication control between this printer apparatus PP and an external apparatus, and various sorts of data processing for a user to operate this printer apparatus PP such as user interface processing and so forth. The system memory 22 stores various control programs which the system control part 21 executes, and also, provides a work area for the system control part 21. The parameter memory 23 stores various sorts of information which is unique to this printer apparatus PP. The clock circuit 24 outputs date/time information, and the operation display part 25 provides a user interface for the user to operate this printer apparatus PP.

The page buffer memory 26 provides a frame memory storing a page of printing data, and the print unit 27 reads printing data from the frame memory of the page buffer memory 26, and prints out an image on paper. To the print unit 27, the multi-stage paper feeding unit 28 is attached. Thereby, an appropriate one is selected from a plurality of types of paper, and is used as recording paper which the print unit 27 uses. As the types of paper contained in the trays, there may be 'A4 longer than it is wide', 'A4 long from side to side', 'B5 longer than it is wide', 'B5 long from side to side', 'A3 longer than it is wide', and so forth.

The radio LAN adapter 29 is used to establish a radio LAN with other communication terminal apparatuses, and the radio LAN communication control part 30 carries out communication control of various predetermined protocol suites for communication of various data with the other radio communication terminal apparatuses.

The system control part 21, the system memory 22, the parameter memory 23, the clock circuit 24, the operation display part 25, the page buffer memory 26, the print unit 27 the multi-stage paper feeding unit 28, and the radio LAN communication control part 30 are connected to an internal bus 31, and communication of data thereamong is carried out mainly by means of the internal bus 31.

In the above-mentioned configuration, upon starting up, the personal computer apparatus PC obtains identification information of all of the radio communication terminal apparatuses which the personal computer apparatus PC can access by means of the radio LAN. In this case, identification information of all of the printer apparatuses PP1 through PPn located within the area AR which is the radio accessible range of the radio LAN adapter 6, is obtained.

When obtaining the identification information, a predetermined radio LAN communication application is used, a reception radio field intensity is measured for each of the printer apparatus PP1 through PPn, and a measurement value thus obtained is stored. The measurement of the reception radio field intensity will be described later with reference to FIG. 11.

Then, for example, when a user who operates a document creating application on the personal computer apparatus PC selects a printing function, the personal computer apparatus PC displays an operation page for the user to select any one of the printed apparatus PP1 through PPn. At this time, the identification information (i.e., the identification information which is notified of from each corresponding printer apparatus PP) of the printer apparatuses PP1 through PPn is displayed on the operation page in such a manner that the printer apparatuses PP1 through PPn are arranged in a decreasing order of the stored measurement values of the reception radio field intensities of the respective printer apparatuses PP1 through PPn, that is, the order in which the printer apparatus having the highest reception field intensity is arranged first, and then, those having the lower reception radio field intensities are arranged in sequence of the measurement values of the reception radio field intensities. In this manner of display of the printer apparatuses PP1 through PPn, since the printer apparatuses PP1 through PPn are arranged in the order of their reception radio field intensities, the user can become free from much considering as to which printer apparatus PP should be selected from among the candidates of the printer apparatuses PP1 through PPn.

That is, assuming that all the printer apparatuses PP1 through PPn use the same type of the radio LAN adapters 29, it can be considered that, as the reception radio field intensity is higher, communication can be carried out more efficiently with the personal computer apparatus PC. Further, it can also be considered that, as the reception radio intensity is higher, the corresponding printer apparatus PP is physically located nearer to the personal computer apparatus PC.

Therefore, by thus arranging the identification information of the printer apparatuses PP in the decreasing order of their reception radio field intensities on the operation page, the user can easily select the printer apparatus PP with which communication can be carried out with higher efficiency or, which is located nearer.

When the user carries out operation to the personal computer apparatus PC to select one printer apparatus PP from among the plurality of printer apparatuses PP1 through PPn, the personal computer apparatus PC transmits a packet of response request to the thus-selected printer apparatus PP.

The response request is a request which causes the printer apparatus PP which has thus received the packet of response request to light or blink a response lamp (i.e., an LED or such, not shown, and the same manner being applied hereinafter) provided on the operation display part 25 thereof, to make a response display on a liquid crystal display device (i.e., the screen, not shown) of the operation display part 25, or so, for a predetermined time, or until the user carries out subsequent operation.

Further, the response which the printer apparatus PP which has received the respond request makes is not limited to such a visual response to appeal to the eyes of the user by lighting or blinking the response lamp or so. For example, instead of such a visual manner, the response which the printer apparatus PP which has received the respond request makes may be made in an audible manner. That is, the printer apparatus PP which has received the respond request may make an audible response to appeal to the user's ears.

According to the embodiment of the present invention, the packet of response request is transmitted when the user selects one printer apparatus PP, and the thus-selected printer apparatus PP then makes visual or audible response. As a result, the user can easily and positively identify the printer apparatus PP which the user himself or herself has actually selected. As a result, the user can properly obtain a printed document printed out by the selected pointer apparatus PP, i.e., the printed document which is output by the printer apparatus PP in response to the user's direction which is made subsequent to the above-mentioned printer apparatus selection operation.

As mentioned above, as a method for the selected printer apparatus PP which has thus received the packet of response request to indicate that the printer apparatus PP itself is thus selected, not only a visual display manner but also an audible display manner may be used. As a specific example of the audible display manner response, generation of a beep sound may be used.

Further, the personal computer apparatus PC is configured so that, when a state in which no communication is carried out continues more than a predetermined time with the selected printer apparatus PP after connection is established with the printer apparatus PP via the radio communication network once, the personal computer apparatus PC disconnects the connection between the personal computer apparatus PC and the printer apparatus PP.

By this configuration, it is possible to prevent connection via the radio communication network between the personal computer apparatus PC and the same printer apparatus PP from continuing for a long time without disconnection.

For example, in a case where a plurality of personal computer apparatuses are located within the area AR, when a state in which the same personal computer apparatus thereof exclusively connects with the specific printer apparatus PP via the radio communication network continues for a long time, another personal computer apparatus cannot use this specific printer apparatus PP. In such a case, by the above-mentioned configuration in which a personal computer apparatus automatically disconnects connection between the personal computer apparatus and the printer apparatus PP when a state in which the personal computer apparatus and the printer apparatus are connected together via the radio communication network without communication therebetween for a predetermined time, such a problematic situation can be avoided.

Figure 4:
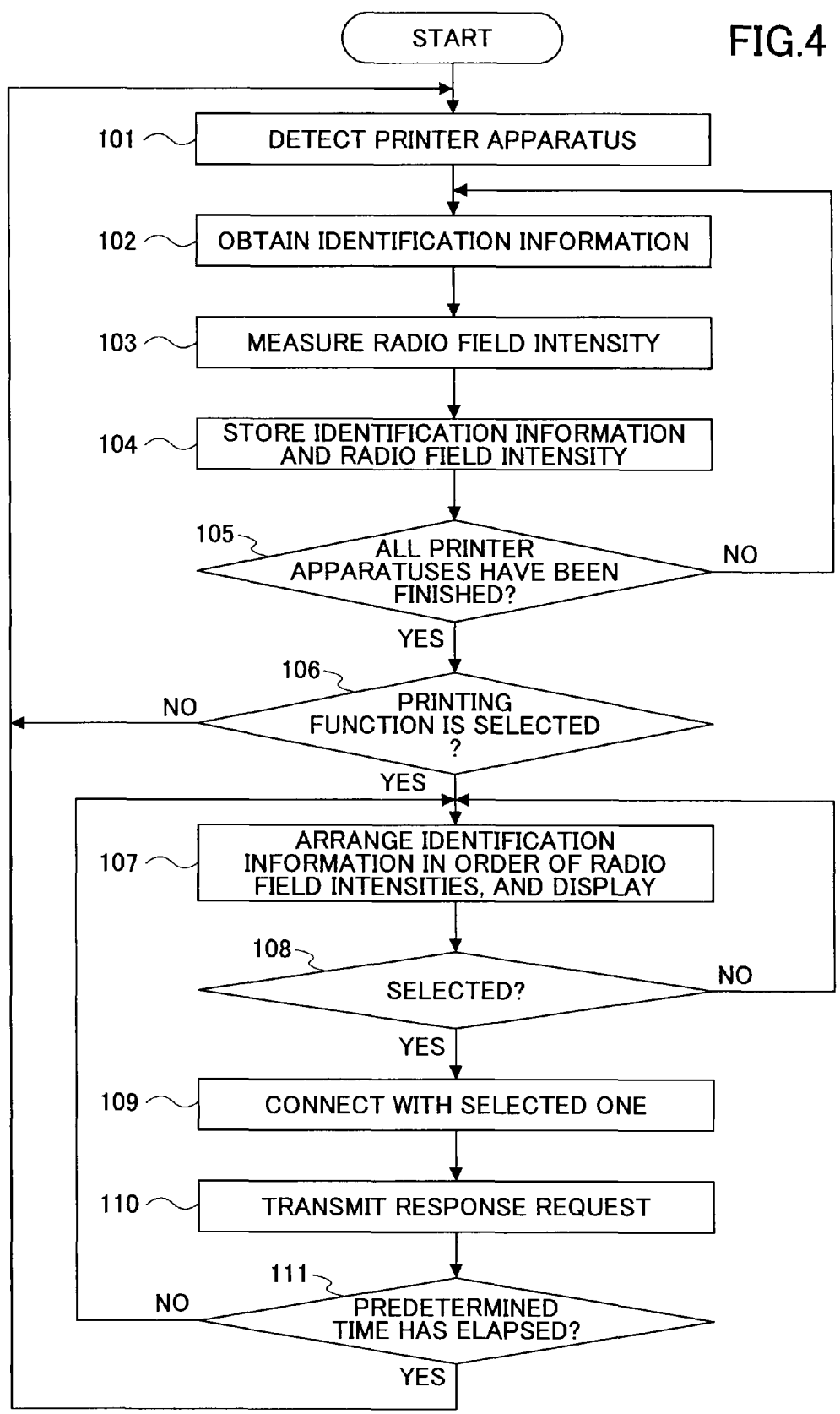
FIG. 4 shows a flow chart of one example of processing of the personal computer apparatus PC.

FIG. 4 shows an example of processing which the personal computer apparatus PC carries out.

The personal computer apparatus PC carries out the following operation under the control of the CPU 1 which operates according to a control program stored in the RAM 3 or the ROM 2.

That is, in FIG. 4, when the personal computer apparatus PC detects the printer apparatus PP (Step 110), the personal computer apparatus PC obtains identification information of the detected printer apparatus PP (Step 102), also measures radio field intensity of radio communication between the personal computer apparatus PC and the printer apparatus PP (Step 103), and stores in the RAM 3 or the magnetic disk device 8 the identification information and the measurement value of the radio field intensity in such a manner that both information are associated together (Step 104). It is noted that the Steps 101 through 103 are carried out with the functions of the radio LAN communication control part 7 and the radio LAN adapter 6.

Then, the personal computer apparatus PC determines whether or not the processing has been finished for all the printer apparatuses PP1 through PPn (Step 105). When a determination result of the Step 105 is NO, Step 102 is returned to, and, for another printer apparatus PP, the personal computer apparatus PC carries out processing to obtain identification information and a measurement value of radio field intensity.

Then, when the processing for all the printer apparatuses PP1 through PPn has been finished, a determination result of Step 105 becomes YES. Then, the personal computer apparatus PC determines whether or not a printing function is selected by a user (Step 106). When a determination result of the Step 106 is NO, Step 101 is returned to, and the processing starting from Step 101 mentioned above is repeated.

When the user selects the printing function as a result of carrying out operation with the use of the keyboard device 13 or the screen direction device 14, a determination result of Step 106 becomes YES. Then, the personal computer apparatus PC submits, to the user, display information arranging the identification information of the printer apparatuses PP in an order of their reception radio intensities stored in Step 104 on the screen of the CRT screen display device 11 (Step 107). Then, the personal computer apparatus PC waits for the user to select any one of the thus displayed printer apparatuses PP with referring to the display information (loop of Steps 107 and 108).

When one printer apparatus PP is selected by the operation with the use of the keyboard device 13 and the screen direction device 14, and thus, a determination result of Step 108 becomes YES, the personal computer apparatus PC connects to the selected printer apparatus PP with the functions of the radio LAN communication control part 7 and the radio LAN adapter 6 (Step 109), and transmits a packet of response request mentioned above (Step 110). In this case, after that, the personal computer apparatus PC transmits, to the printer apparatus PP, information indicating a printing job, via the radio LAN with the functions of the radio LAN communication control part 7 and the radio LAN adapter 6. The printer apparatus PP thus having received it prints out printing data included in the thus-received information indicating the printing job.

Further, after that, until a predetermined time has elapsed, the processing of Steps 107 through 110 is repeated (loop initiated by NO of Step 111). Then, when a determination result of Step 111 becomes YES, Step 101 is returned to, and the processing starting from Step 101 is repeated.

Figure 5:
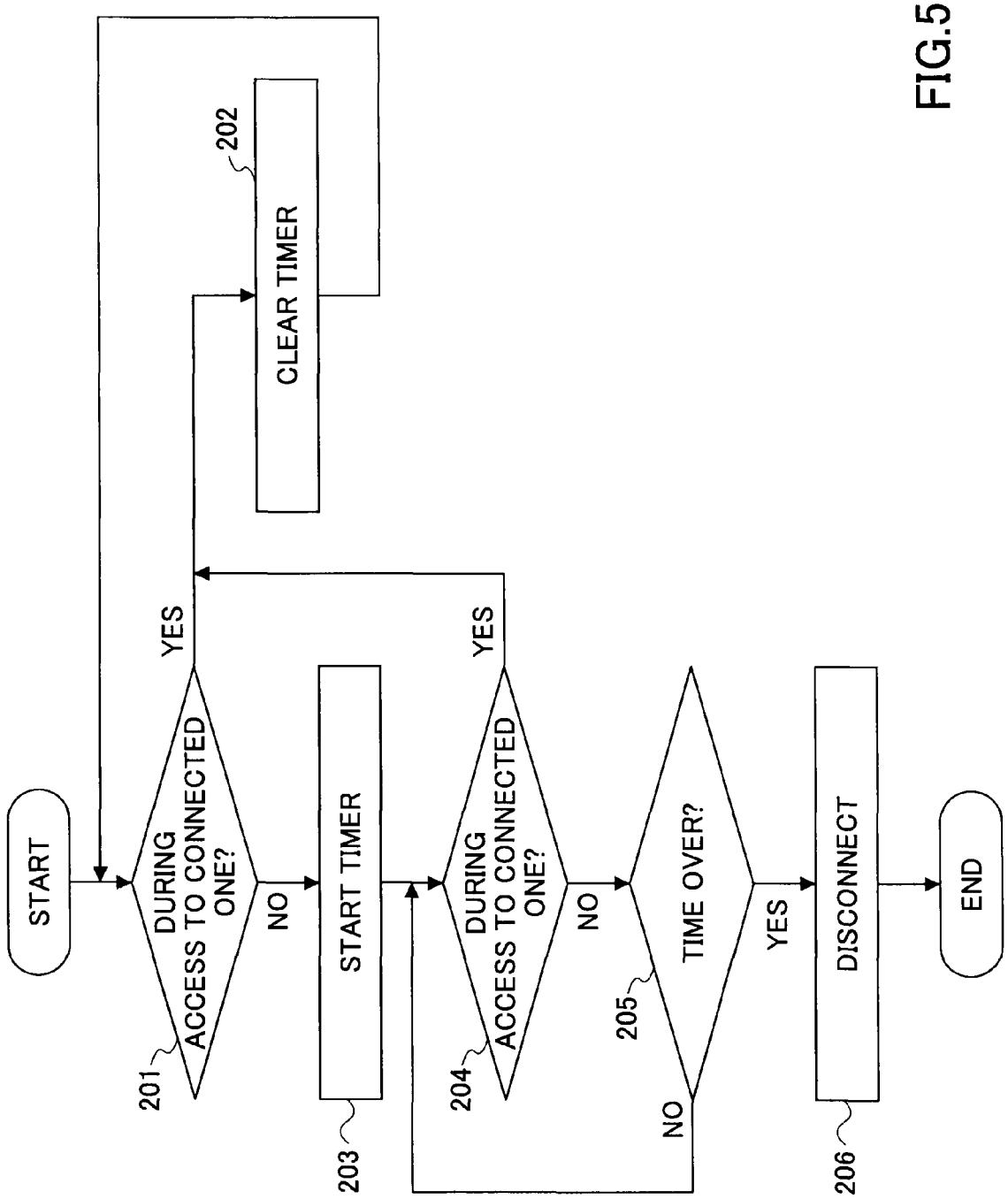
FIG. 5 shows a flow chart of another example of processing of the personal computer apparatus PC.

FIG. 5 shows one example of processing concerning disconnection of connection via the radio communication network with a communication counterpart carried out by the personal computer apparatus PC.

In FIG. 5, when the personal computer apparatus PC is currently accessing a connection counterpart via the radio communication network, i.e., the printer apparatus PP (YES of a determination result of Step 201), the personal computer apparatus PC resets a timer (i.e., a timer function of the clock circuit 5) for measuring an idle time (i.e., resets a time measured by the timer, the same manner being applied hereinafter) (Step 202). When the personal computer apparatus PC does not currently access the connection counterpart (i.e., the printer apparatus PP) via the radio communication network (NO of a determination result of Step 201), the personal computer apparatus PC starts time measuring operation of the timer (Step 203), and determines whether or not the personal computer apparatus PC currently accesses the connection counterpart via the radio communication network (Step 204). When a determination result of Step 204 is NO, the personal computer apparatus PC waits for when the measured time of the timer has reached a predetermined time (loop initialized by NO of Step 205).

When, during the loop of Steps 204 and 205, the personal computer apparatus PC carries out accessing the connection counterpart via the radio communication network, a determination result of Step 204 becomes YES. In this case, Step 202 is carried out, and thus, the timer is reset.

On the other hand, when a determination result of Step 205 is YES, the personal computer apparatus PC disconnects the connection with the connection counterpart via the radio communication network (Step 206).

Thus, when the personal computer apparatus PC does not carry out communication (i.e., accessing) for a predetermined time during connection via the radio communication network between the personal computer apparatus PC and the printer apparatus PP, the personal computer apparatus PC automatically disconnects the connection. As a result, as mentioned above, it is possible to solve the problem that, a certain personal computer apparatus monopolizes a printer apparatus for a long time and thus, another personal computer apparatus is prevented from using the printer apparatus.

Figure 6:
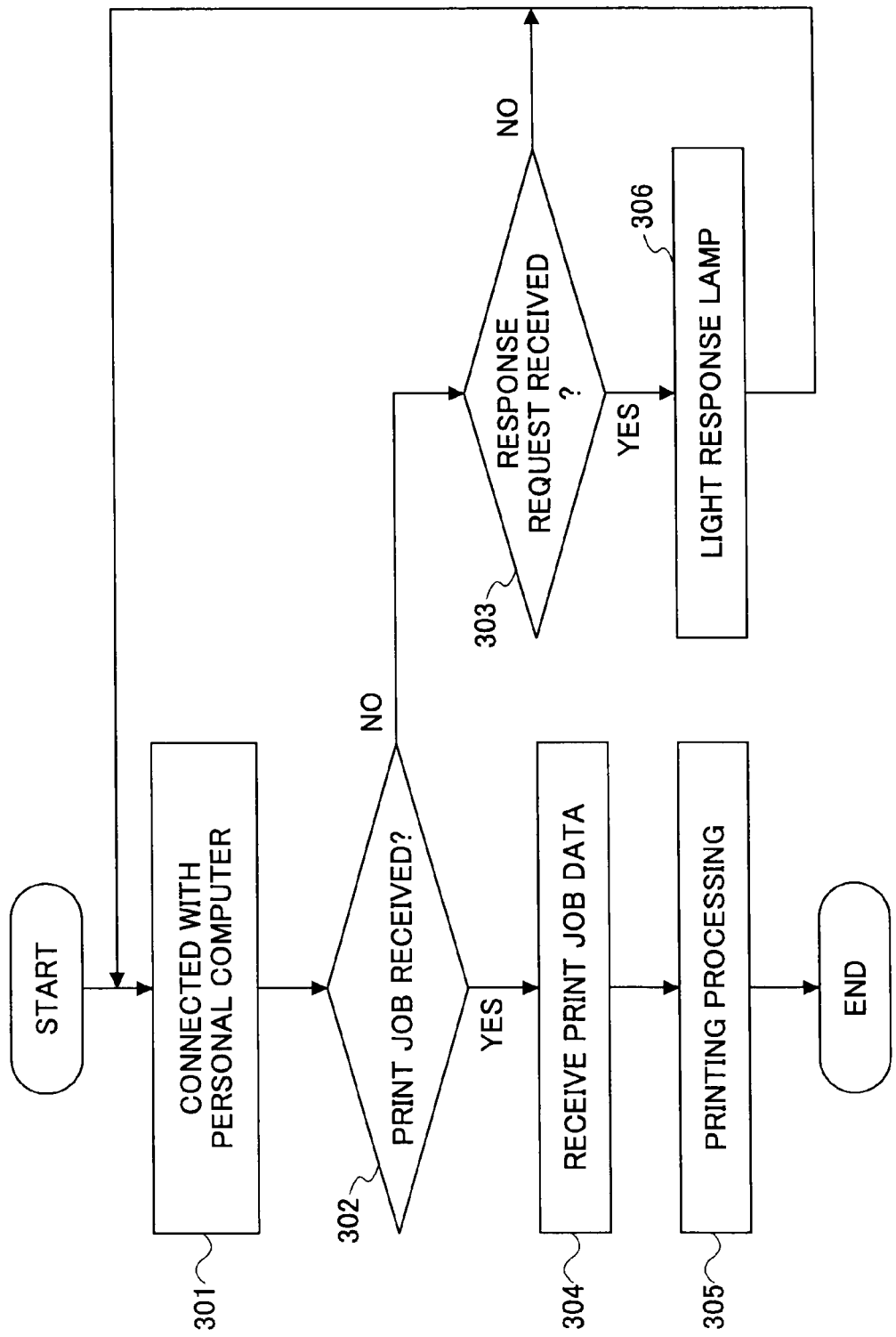
FIG. 6 shows a flow chart of one example of processing of the printer apparatus PP.

FIG. 6 shows one example of processing carried out by the printer apparatus PP.

When the printer apparatus PP is connected with the personal computer apparatus PC via the radio LAN with the functions of the radio LAN communication control part 30 and the radio LAN adapter 29 (Step 301), the printer apparatus PP monitors as to whether to receive information indicating a printing job such as that mentioned above, or to receive a packet of response request such as that mentioned above (loop of Steps 302, 303, 301). Then, when the printer apparatus PP receives information indicating a printing job and thus, a determination result of Step 302 becomes YES, the printer apparatus PP receives corresponding printing data (Step 304), and, prints out it to obtain a printed document with the functions of the page buffer memory 26, the print unit 27 and so forth (Step 305).

When the printer apparatus PP receives a packet of response request and a determination result of Step 303 becomes YES, the printer apparatus PP lights the response lamp on the operation display part 25 (Step 306).

It is noted that, in the first embodiment described above, the printer apparatuses PP1 through PPn which act as radio communication terminal apparatuses in the same type are located within the area AR in which the radio LAN adapter 6 of the personal computer apparatus PC can reach via the radio LAN. Furthermore, in the area AR, another radio communication terminal apparatus having a different device function may be located. That is, for example, another external device such as a scanner device, a digital still camera device, a mouse, a data modem or such, each having a radio LAN function, may be located in the area AR.

In such a case, the personal computer PC communicates with the respective radio communication terminal apparatuses, and obtains information of respective functions of these radio communication terminal apparatuses, i.e., types of the above-mentioned device functions (which may be referred to also as processing functions, hereinafter), respective identification information of these radio communication terminal apparatuses, and also, measures reception radio field intensities of the corresponding communication as mentioned above. Then, when a user carries out operation on the personal computer apparatus PC by operating the keyboard device 13 or the screen direction device 14 thereof to select one of these device functions, the personal computer apparatus PC displays the identification information of the radio communication terminal apparatuses having the thus-selected device function in such a manner to arrange in an order such as from one having the highest measurement value of reception radio field intensity through the lowest measurement value of radio field identity, on the CRT screen display device 11. Thus, display elements (i.e., the respective identification information of the respective radio communication terminal apparatuses) are arranged effectively on the CRT screen display device 11 in a manner advantageous when the user selects from the radio communication terminal apparatuses having the same device function.

As a result, when the user is to use the desired device function, appropriately information can be provided to the user such that the user can easily and positively select an appropriate one of the radio communication terminal apparatuses having the device function.

Figure 7:
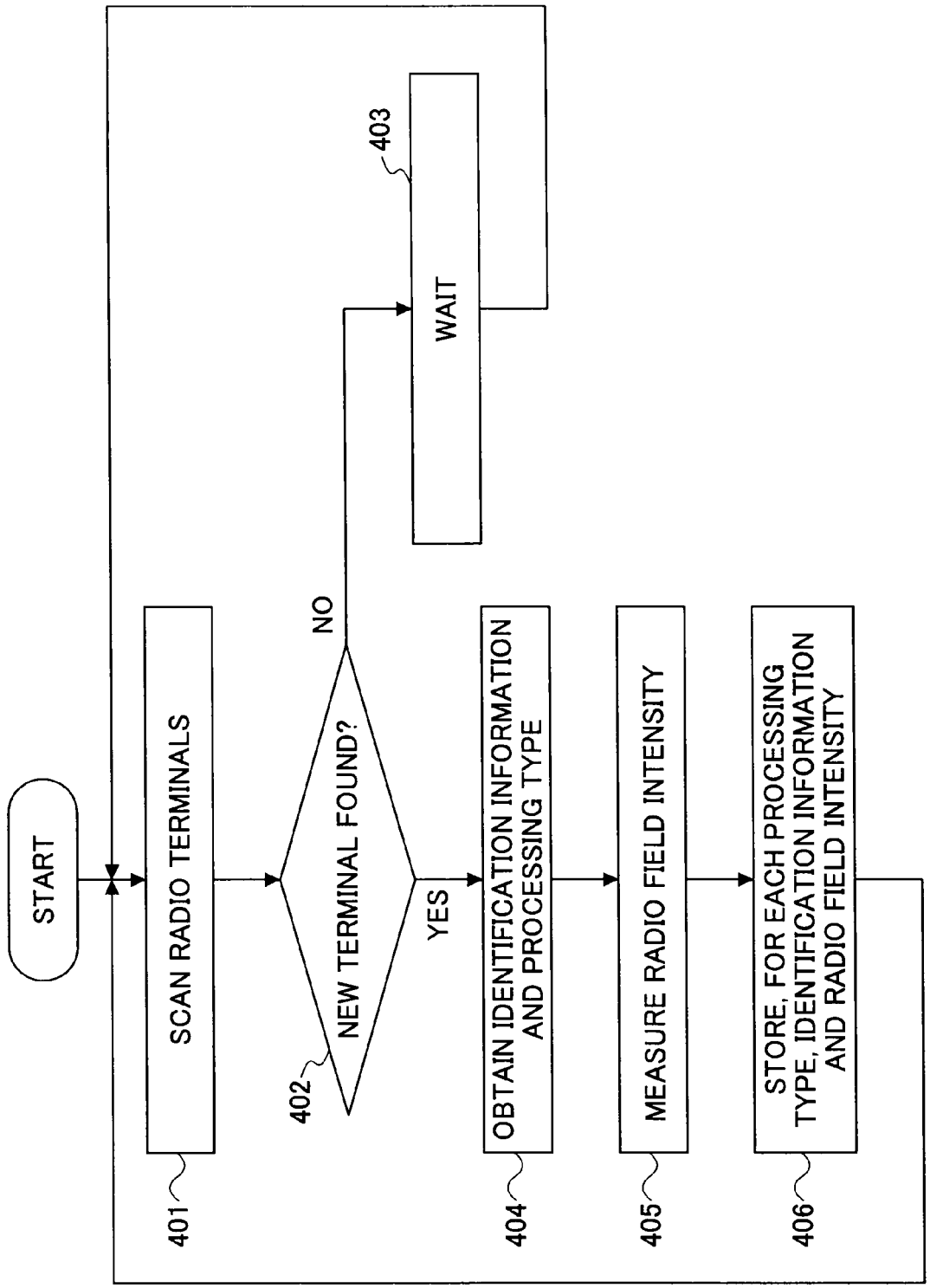
FIG. 7 shows a flow chart of further another example of processing of the personal computer apparatus PC.

FIG. 7 shows an embodiment for this case, that is, one example of processing carried out by the personal computer apparatus PC in the radio communication network system in a second embodiment of the present invention.

The radio communication network system in the second embodiment has the same configuration and functions as those of the first embodiment described above with reference to FIGS. 1-6. Therefore, mainly differences therefrom will now be described.

First, the personal computer PC scans the radio LAN with the functions of the radio LAN communication control part 7 and the radio LAN adapter 6, and thus, searches for new radio communication terminal apparatuses (Steps 401, 402, 403).

When a new radio communication terminal apparatus is find out, a determination result of Step 402 becomes YES, the personal computer apparatus PC obtains, from the thus-found radio communication terminal apparatus, identification information and a processing type thereof (Step 404), measures reception radio field intensity of communication between the personal computer apparatus PC and the radio communication terminal apparatus (Step 405), stores, for each processing type, the identification information and the reception radio field intensity in the RAM 3 or the magnetic disk device 8 (Step 406), and returns to Step 401.

Figure 8:
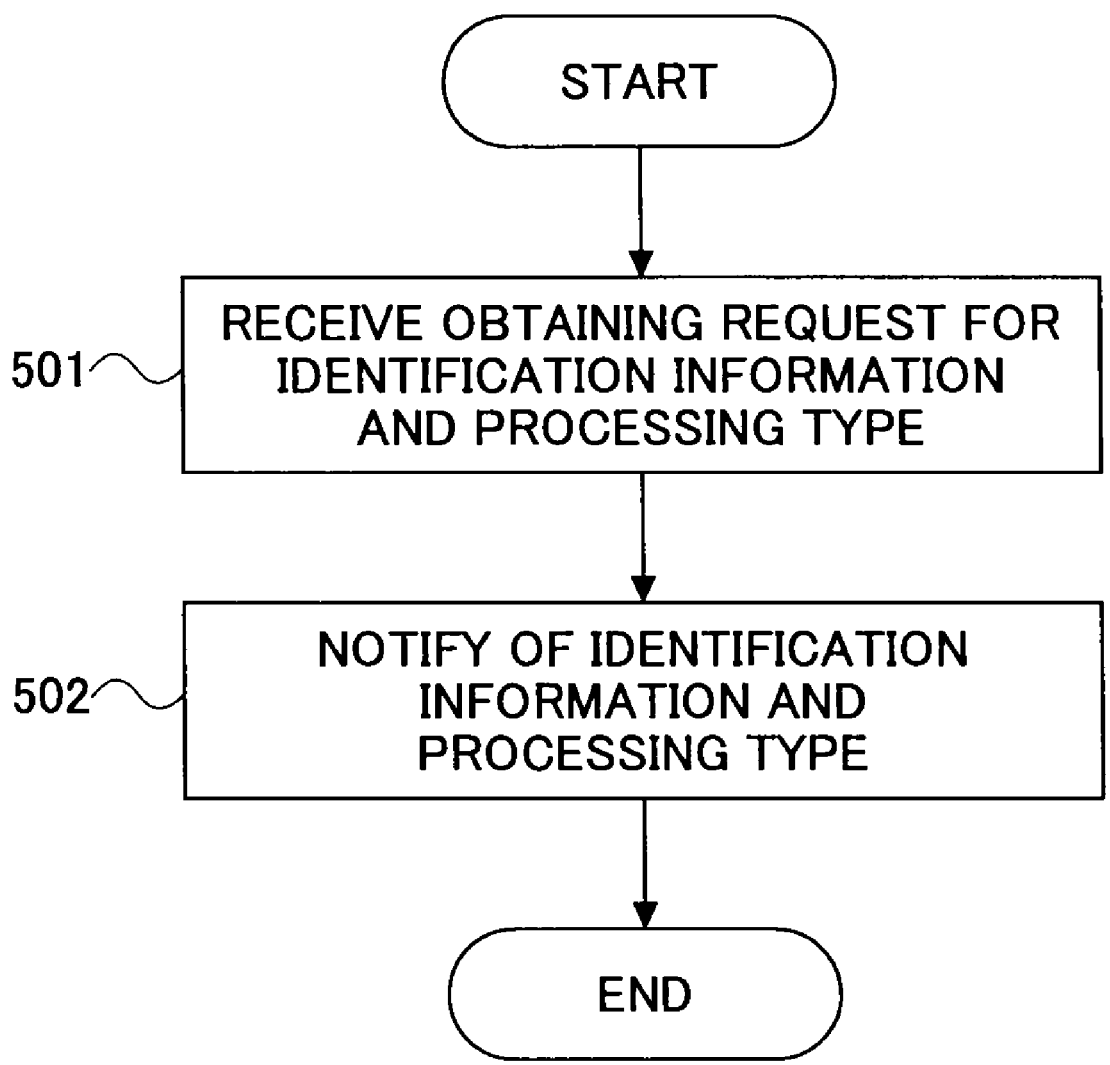
FIG. 8 shows a flow chart of one example of processing on the side of a terminal apparatus.

FIG. 8 shows one example of processing on the side of the radio communication terminal apparatus, acting as a connection counterpart via the radio communication network of the personal computer apparatus PC.

The radio communication terminal apparatus acting as the connection counterpart of the personal computer apparatus PC receives a request from the personal computer apparatus PC for obtaining the identification information and the processing type of the radio communication terminal apparatus itself (Step 501), and then, notifies the personal computer apparatus PC of the identification information and the processing type which are stored in the radio communication terminal apparatus itself (Step 502).

As mentioned above, depending on a radio communication standard, peer-to-peer communication restricts corresponding two radio communication terminal apparatuses which communicate with one another. In this case, the following situation may occur. That is, for example, in a case where a plurality of personal computer apparatuses and a plurality of printer apparatuses are located within an area AR, when a personal computer C1 thereof connects with a printer apparatus P1 thereof via a radio communication network, another personal computer apparatus C2 cannot connected with the printer apparatus P1 via the radio communication network.

Then, as described above, in a case where no communication is carried out for more than a predetermined time during connection between the personal computer C1 and the printer apparatus P1 via the radio communication network, the personal computer apparatus C1 detects this fact with a function of timer, and then, automatically disconnects the connection via the radio communication network between the personal computer apparatus C1 and the printer apparatus P1. As a result, after the connection between the personal computer apparatus P1 and the printer apparatus P1 via the radio communication network is thus disconnected, the another personal computer apparatus C2 then can connect with the printer apparatus P1 via the radio communication network.

Further, as mentioned above, in the case where no communication is carried out for more than a predetermined time during connection between the personal computer C1 and the printer apparatus P1 via the radio communication network, the personal computer apparatus C1 detects this fact with a function of timer, and then, automatically disconnects the connection via the radio communication network between the personal computer apparatus C1 and the printer apparatus P1. Then, after that, the same personal computer apparatus C1 may need to again connect with the printer apparatus P1. In such a case, when the connection between the another personal computer apparatus C2 and the printer apparatus P1, which is established after the first connection between the personal computer apparatus C1 and the printer apparatus P1 is thus disconnected as mentioned above, is then disconnected, the personal computer C1 can again connect with the printer apparatus P1.

In this case, when the printer apparatus P1 is still connected by the another personal computer apparatus C2 at the time when the personal computer apparatus C1 needs to again connect with the printer apparatus P1, the personal computer apparatus C1 may preferably lead the user to connect with another printer apparatus P2 via the radio communication network, for example, the personal computer apparatus C1 may indicate to the user a corresponding guidance message on its display screen. That is, during a list of a plurality of printer apparatuses being displayed on the display screen of the personal computer apparatus C1, identification information corresponding to the printer apparatus P1 may be grayed out (that is, a display color thereof is changed from black into gray, for example). This manner of display indicates that the user is not allowed to select the printer apparatus P1. Thus, the user is lead to select another printer apparatus.

Figure 9:
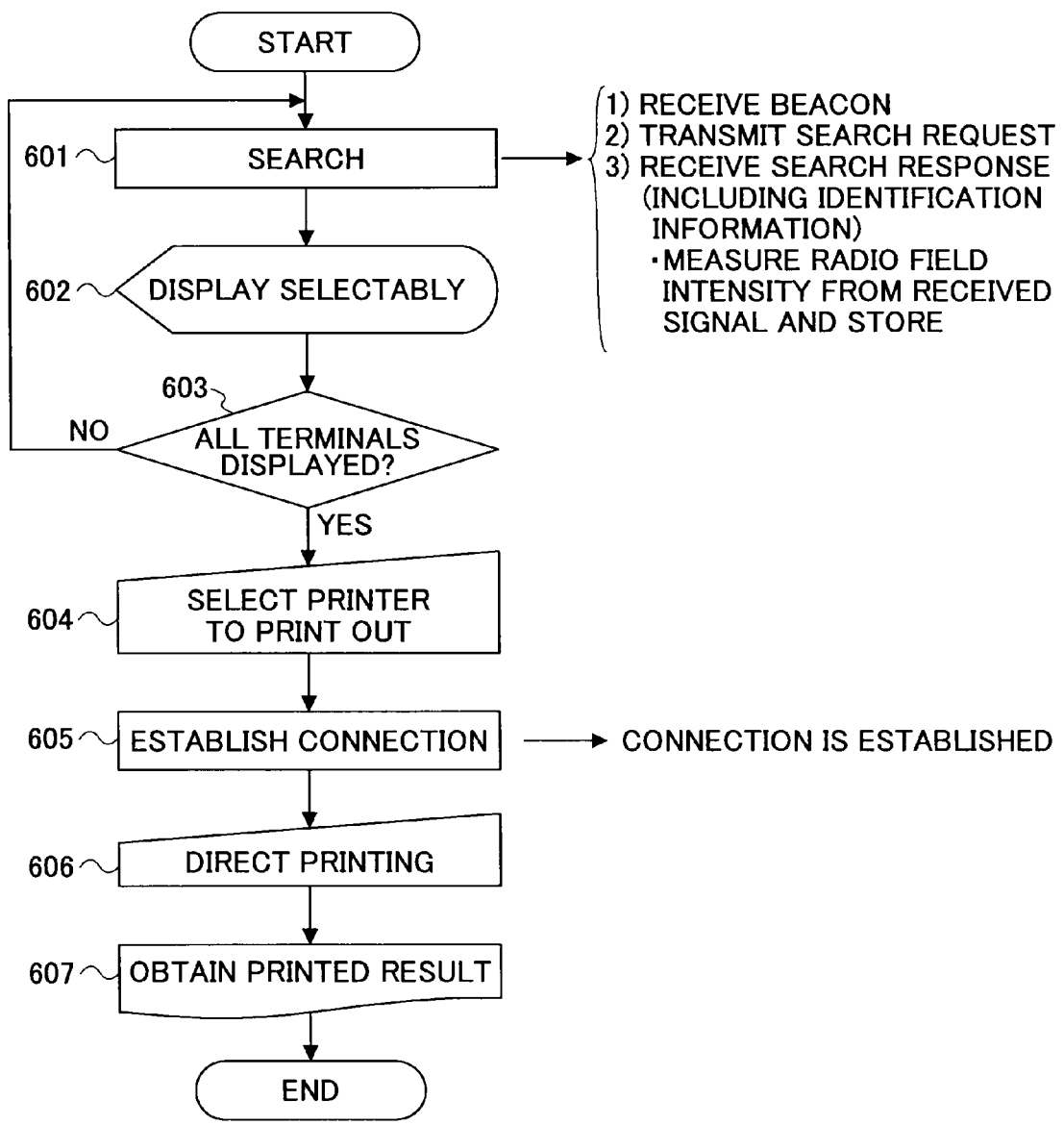
FIG. 9 shows a flow chart of processing from printer search through printing.

FIG. 9 shows a flow chart illustrating a flow of operation of the personal computer apparatus PC in the radio communication network system in a third embodiment of the present invention.

The radio communication network system in the third embodiment has the same configuration and functions as those of the first embodiment described above with reference to FIGS. 1-6. Therefore, mainly differences therefrom will now be described.

That is, according to the third embodiment, the personal computer apparatus PC carries out the following operation under the control of the CPU 1 which operates according to a control program stored in the RAM 3 or the ROM 2:

That is, the personal computer apparatus PC searches for the printers PP1 through PPn in Step 601. That is, with the functions of the radio LAN communication control part 7 and the radio LAN adapter 6, 1) the personal computer apparatus PC receives beacons transmitted by the respective printer apparatuses PP1 through PPn, 2) transmits a search request to the transmission sources which have thus transmitted the beacons, and 3) receives search responses to the search request from the transmission sources. In each search response, identification information of the printer apparatus PP which is the transmission source transmitting the search response. Further, the personal computer apparatus PC measures reception radio field intensity of communication when receiving a signal such as the search response or such from the transmission source. Then, the personal computer apparatus PC stores the identification information of each printer apparatus PP and the measurement value of the reception radio field intensity of the communication between the personal computer apparatus PC and the printer apparatus PP thus obtained, in the RAM 3 or the magnetic disk device 8 in such a manner that the identification information and the measurement value are associated together.

Next, in Step 602, based on the identification information and the measurement value of the reception radio field intensity of the communication between the personal computer apparatus PC and the printer apparatus PP which are thus stored in the RAM 3 or the magnetic disk device 8 in the manner that the identification information and the measurement value are associated together, the personal computer apparatus PC submits, to its user, display information arranging the identification information of the printer apparatuses PP in an order of their reception radio field intensities. Then, in Step 603, the personal computer apparatus PC determines whether or not, as a result of thus displaying the identification information of the printer apparatuses PP, display of the identification information of all the printer apparatuses PP is finished. When a determination result thereof is NO, Steps 601, 602 and 603 are repeated until the determination result becomes YES.

When a determination result of Step 603 becomes YES, the personal computer apparatus PC waits for when the user carries out operation to select any printer apparatus PP (Step 604).

When the user carries out operation (Step 604) on the keyboard device 13 or the screen direction device 14 to select one printer apparatus PP from among the printer apparatuses PP1 through PPn which are thus displayed in a form of their identification information on the CRT screen display device 11 through Steps 601, 602 and 603, the personal computer apparatus PC establishes connection with the thus-selected printer apparatus PP (Step 605) via the radio LAN with the functions of the radio LAN communication control part 7 and the radio LAN adapter 6.

After that, the personal computer apparatus PC transmits (Step 606) information indicating a printing job via the radio LAN with the functions of the radio LAN communication control part 7 and the radio LAN adapter 6, to the printer apparatus PP. The printer apparatus PP prints out thus-obtained printing data included in the information indicating the printing job to obtain a printed document.

Then, the user obtains the printed document thus printed out by the printer apparatus PP (Step 607).

Figure 10:
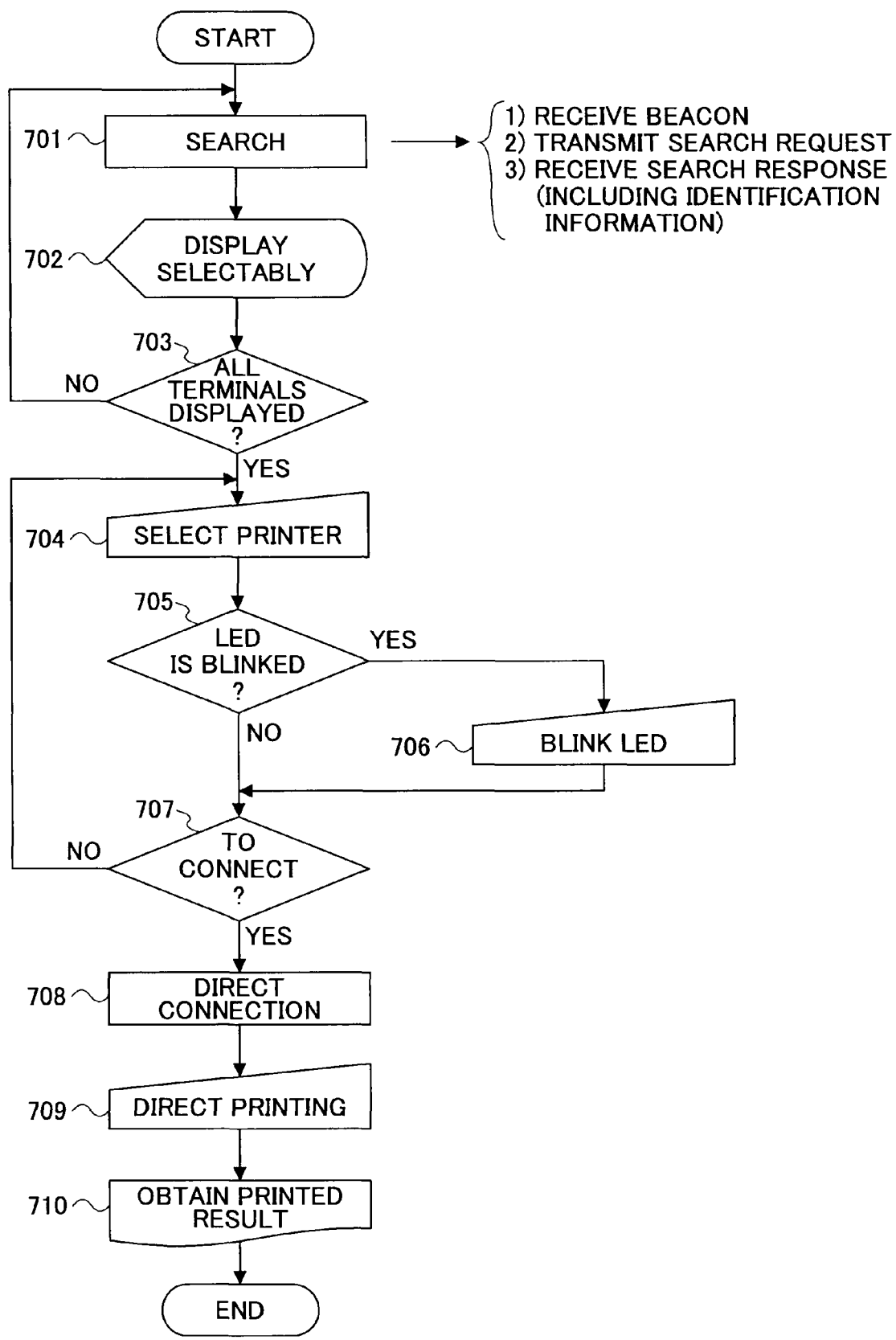
FIG. 10 shows a flow chart of processing when an LED is lit or blinked.

FIG. 10 shows a flow chart illustrating a flow of operation of a radio communication network system in a variant embodiment of the above-described third embodiment of the present invention.

The radio communication network system in the variant embodiment of the third embodiment has the same configuration and functions as those of the third embodiment described above with reference to FIG. 9. Therefore, mainly differences therefrom will now be described.

That is, according to the variant embodiment, the personal computer apparatus PC carries out the following operation under the control of the CPU 1 according to a control program stored in the RAM 3 or the ROM 2.

In FIG. 10, Steps 701 through 704 are the same as Steps 601 through 604 of FIG. 9 described above. Further, Step 709 through 710 of FIG. 10 are the same as Steps 606 and 607 of FIG. 9 described above. Therefore, only Steps 705, 706, 707 and 708 will be described.

In Step 705, the personal computer apparatus PC determines whether or not to carry out a response request mentioned above. In this case, for example, the personal computer apparatus PC displays on the CRT screen display device 11 to the user to inquire whether or not to carry out a response request to a selected printer apparatus PP. Then, when the user operates the keyboard device 13 or the screen direction device 14 for a direction in response thereto, the personal computer apparatus PC follows the direction. That is, when the user carries out operation to give a direction such that the response request should be made, a determination result of Step 705 becomes YES. When the user carries out operation to give a direction such that the response request should not be made, a determination result of Step 705 becomes NO.

When a determination result of Step 705 becomes YES, the personal computer apparatus PC transmits a packet of response request to the selected printer apparatus PP. The response request is a request for the printer apparatus PP to light or blink the response lamp (not shown) provided on the operation display part 25 for a predetermined time or until the user carries out next operation, or shows a response on the liquid crystal display device (not shown) of the operation display part 25, or so.

The same as in the first embodiment described above, a configuration may be made such that, not only such a visual response appealing to the user's eyes such that the printer apparatus PP lights or blinks the response lamp or to shows a response on the operation display part 25 in response to receiving the packet of response request, but also, an audible response appealing to the user's ears may be made by the printer apparatus PP in response to receiving the packet of response request.

Next, the personal computer apparatus PC determines in Step 707 whether or not connection via the radio communication network with the selected printer apparatus PP is to be made. In this case, for example, the personal computer apparatus PC shows an indication such as a message to inquire the user as to whether or not connection with the selected printer apparatus PP via the radio communication network is to be made, to the user on the CRT screen display device 11. Then, when the user operates the keyboard device 13 or the screen direction device 14 to give a direction to the personal computer apparatus PC, the personal computer apparatus PC follows the direction. That is, when the user gives the direction to connect with the selected printer apparatus PP via the radio communication network, a determination result of Step 707 becomes YES. When the user gives the direction not to connect with the selected printer apparatus PP via the radio communication network, a determination result of Step 707 becomes NO.

When a determination result of Step 707 becomes YES, the personal computer apparatus PC establishes connection with the selected printer apparatus PP via the radio LAN with the functions of the radio LAN communication control part 7 and the radio LAN adapter 6 (Step 708).

Figure 11:
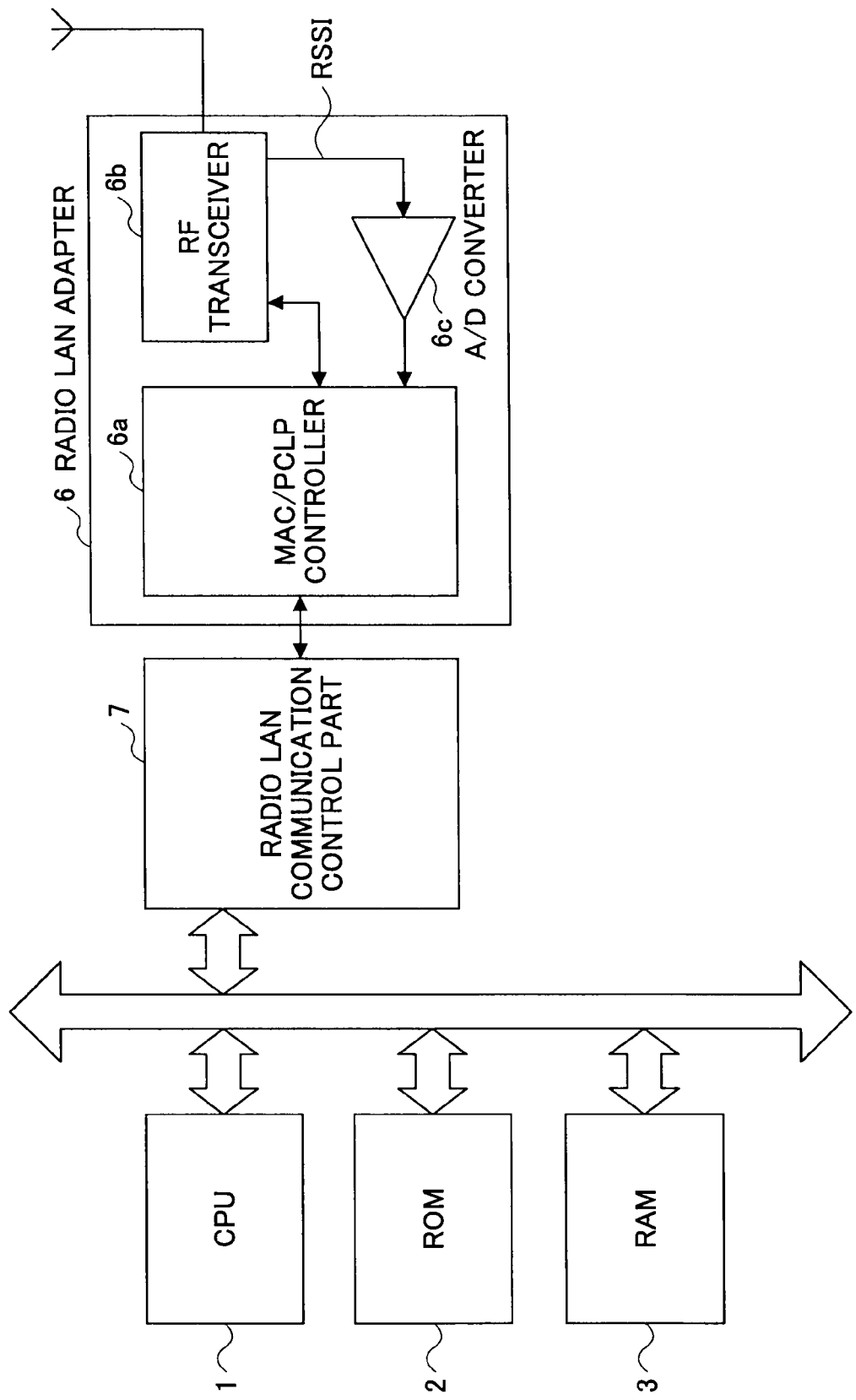
FIG. 11 shows a block diagram illustrating a configuration for measuring a radio field intensity.

FIG. 11 shows a block diagram illustrating a specific method for measuring reception radio field intensity, which is carried out in each of Step 103 of FIG. 4, Step 405 of FIG. 7, Step 601, 3) of FIG. 9 and Step 701, 3) of FIG. 10.

As a specific method for measuring reception radio field intensity, a method of well-known RSSI (received signal strength indication) may be applied.

FIG. 11 shows one example of a configuration of the radio LAN adapter 6 shown in FIG. 2, when the RSSI method is applied.

In this example, as shown in FIG. 11, the radio LAN adapter 6 includes a MAC/PLCP controller 6a, an RF transceiver 6b and an A/D converter 6c.

According to the RSSI method, the RF transceiver 6b outputs reception radio field intensity in a voltage. This voltage is then converted into digital information by the A/D converter 6c. Then, the digital information of the reception radio field intensity is read by the CPU 1 via the MAC/PLCP controller 6a and the radio LAN communication control part 7, and, the CPU 1 writes the digital information in the RAM 3 or the magnetic disk device 8.

It is noted that such a method does not depend from a communication standard actually applied.

Figure 12:
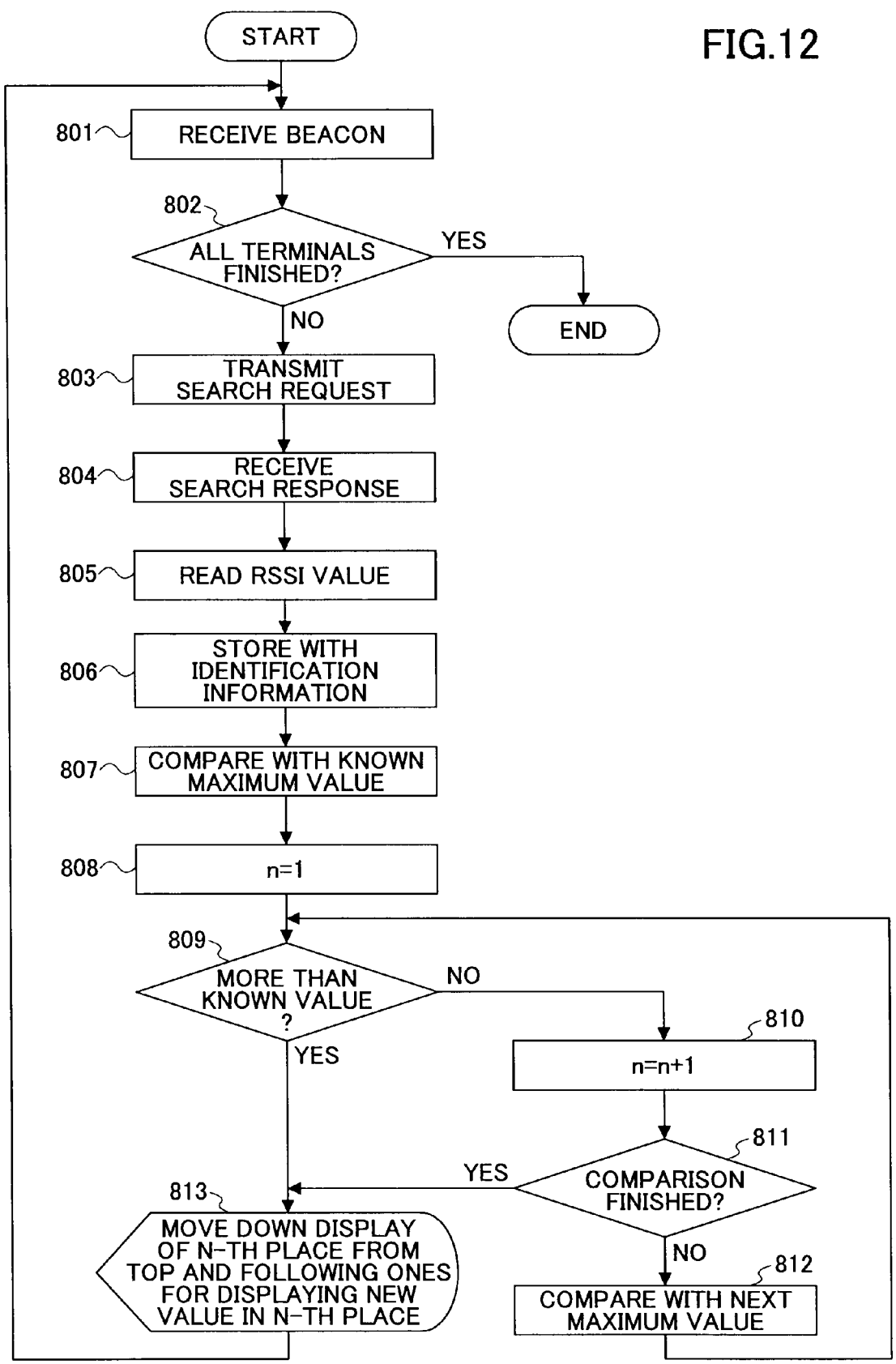
FIGS. 12 and 13 show a flow chart of processing from radio field intensity measurement through display.

FIG. 12 illustrates one example of operation of obtaining identification information of the printer apparatuses or the radio communication terminal apparatuses, measuring reception radio field intensities of radio communication with the printer apparatuses or the radio communication terminal apparatuses, and display operation to display the printer apparatuses or the radio communication terminal apparatuses to the user, applicable to each of the first embodiment described above with reference to FIG. 4 and so forth, the second embodiment described above with reference to FIG. 7 and so forth, the third embodiment described above with reference to FIG. 9 and the variant embodiment described above with reference to FIG. 10.

In FIG. 12, the personal computer apparatus PC receives beacons transmitted by the printer apparatuses PP1 through PPn or the radio communication terminal apparatuses (Step 801). Then, the personal computer apparatus PC determines in Step 802 whether or not all the printer apparatuses PP1 through PPn or all the radio communication terminal apparatuses have been thus processed. When all the printer apparatuses PP1 through PPn or all the radio communication terminal apparatuses have been thus processed (YES in Step 802), the operation of FIG. 12 is finished.

When a determination result of Step 802 is NO, the personal computer apparatus PC transmits search requests to the transmission sources of the beacons (Step 802), receives search responses thereto from the transmission sources (Step 803) and obtains identification information therefrom (Step 804).

In Step 804, the personal computer apparatus PC receives reception radio field intensities of communication when receiving the search responses, and, in Step 805, the personal computer apparatus PC writes the thus-obtained reception radio field intensities in the RAM 3 or the magnetic disk device 8 together with the corresponding identification information of the printer apparatuses PP1 through PPn or the radio communication terminal apparatuses which are the transmission sources of the beacons in Step 805.

The personal computer apparatus PC then compares the maximum value from among the values of the reception radio field intensities written in Step 806 in the previous loops (i.e., the loops of Steps 801 through 813) with the value of the reception radio field intensity written in the current loop (Step 807). Then, Step 808, 1 is substituted for a parameter n. Next, when a result of comparison of Step 807 is such that the value of the reception radio field intensity written in the current loop is not equal to or more than the maximum value of the reception radio field intensities written in the preceding loops (NO in Step 809), the personal computer apparatus PC increments by 1 the parameter 1 (Step 810), and determines in Step 811 whether or not comparison between the reception radio field intensity written in the current loop and the values of all the reception radio field intensities written in the preceding loops (Step 812 described later) has been finished.

When comparison between the reception radio field intensity written in the current loop and the values of all the reception radio field intensities written in the preceding loops has not been finished yet (NO in Step 811), the comparison is made in Step 812 between the next maximum value of the reception radio field intensities written in the preceding loops and the reception radio field intensity written in the current loop. Then, the personal computer apparatus PC determines whether or not a result of the comparison of Step 812 is that the value of the reception radio field intensity written in the current loop is larger.

The loop of Steps 809 through 812 is repeated until, as a result of the comparison between the value of the reception radio field intensity written in the current loop and the values of the reception radio field intensities written in the preceding loops, the value of the parameter n comes to indicate a corresponding place of the reception radio field intensity written in the current loop among those already written. When the value of the parameter n comes to indicate a corresponding place of the reception radio field intensity written in the current loop among those already written, a determination result of Step 809 becomes YES, and the above-mentioned loop processing is finished. Or, when a determination result of Step 811 becomes YES before a determination result of Step 809 becomes YES, this means that the reception radio field intensity written in the current loop is the lowest one, and the loop processing is finished also in this case.

When the loop processing of Steps 809 through 812 is thus finished, Step 813 is carried out. In Step 813, according to the value of the parameter n indicating the corresponding place of the reception radio field intensity written in the current loop, the corresponding identification information is inserted in the arrangement of the identification information of the respective printer apparatuses PP1 through PPn or the respective radio communication terminal apparatuses so that the corresponding identification is displayed in the corresponding n-th place. Also, the other identification information which has a lower place is moved down in the arrangement of the identification information accordingly. Then, Step 801 is returned to.

By the above-described processing, the identification information of the respective printer apparatus PP1 through PPn or the respective radio communication terminal apparatuses is arranged in the order of the respective radio field intensities (i.e., the reception radio field intestines) of the signals transmitted from the corresponding printer apparatuses PP1 through PPn or radio communication terminal apparatuses, is displayed on the CRT screen display device 11, and is thus submitted to the user.

Figure 13:
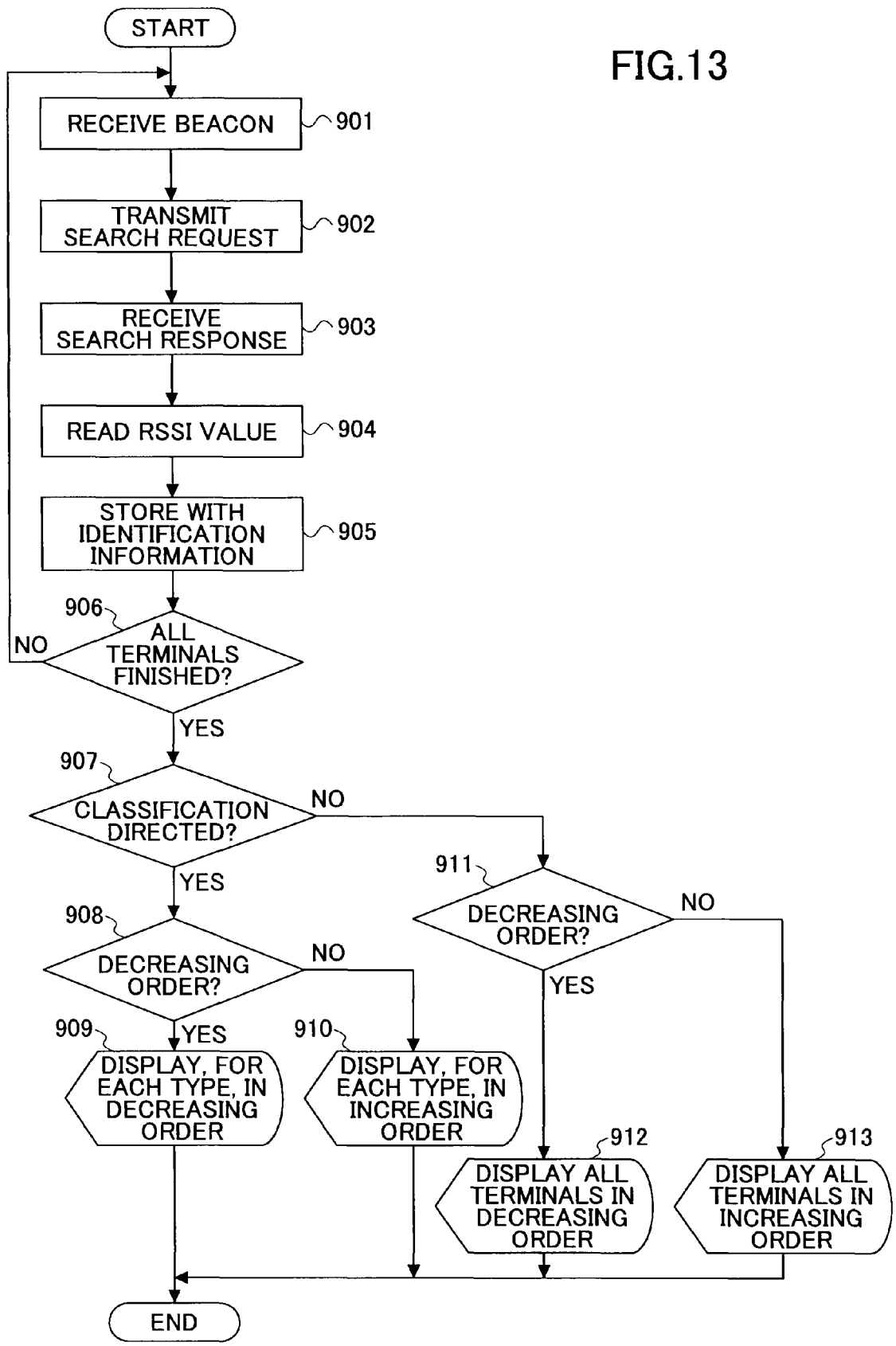

FIG. 13 illustrates another example of operation of obtaining identification information of the printer apparatuses or the radio communication terminal apparatuses, measuring reception radio field intensities of radio communication with the printer apparatuses or the radio communication terminal apparatuses, and display operation to display the printer apparatuses or the radio communication terminal apparatuses to the user, applicable to each of the first embodiment described above with reference to FIG. 4 and so forth, the second embodiment described above with reference to FIG. 7 and so forth, the third embodiment described above with reference to FIG. 9 and the variant embodiment described above with reference to FIG. 10.

In FIG. 13, the personal computer PC receives beacons transmitted by the printer apparatuses PP1 through PPn or the radio communication terminal apparatuses (Step 901). Then, the personal computer PC transmits search requests to the transmission sources of the beacons (Step 902), receives search responses thereto from the transmission sources and obtains identification information therefrom (Step 903).

Then, in Step 904, the personal computer apparatus PC obtains reception radio field intensities of communication when receiving the search responses, and, in Step 905, the personal computer apparatus PC writes the thus-obtained reception radio field intensities in the RAM 3 or the magnetic disk device 8 together with the corresponding identification information of the printer apparatuses PP1 through PPn or the radio communication terminal apparatuses which are the transmission sources of the beacons.

Next, in Step 906, the personal computer apparatus PC determines whether or not all the printer apparatuses PP1 through PPn or all the radio communication terminal apparatuses have been processed. When all the printer apparatuses PP1 through PPn or all the radio communication terminal apparatuses have not been processed yet (NO in Step 906), Step 901 is returned to, and the processing starting from Step 901 is repeated.

When all the printer apparatuses PP1 through PPn or all the radio communication terminal apparatuses have been processed (YES in Step 906), the personal computer apparatus PC determines in Step 907 whether or not 'classification direction' is given by the user.

'Classification direction' means a direction for the personal computer apparatus PC to display a list of the printer apparatuses PP1 through PPn or the radio communication terminal apparatuses in such a manner that the printer apparatuses PP1 through PPn or the radio communication terminal apparatuses are classified or separated according to their functions, i.e., device functions or processing types thereof.

When a determination result of Step 907 is NO, the personal computer apparatus PC determines in Step 908 whether or not display of the printer apparatuses PP1 through PPn or the radio communication terminal apparatuses are made in a decreasing order. Display in the decreasing order means to arrange the printer apparatuses PP1 through PPn or the radio communication terminal apparatuses in display according to the radio field intensities of signals received from the respective printer apparatuses PP1 through PPn or radio communication terminal apparatuses (i.e., the reception radio field intensities).

When a determination result of Step 908 is YES, the personal computer apparatus PC displays the printer apparatuses PP1 through PPn or the radio communication terminal apparatuses in the order of the respective reception radio field intensities after classifying or separating them according to the respective processing types mentioned above. A specific example of such a manner of display will be described later with reference to FIG. 14.

On the other hand, when a determination result of Step 908 is NO, the personal computer apparatus PC displays the printer apparatuses PP1 through PPn or the radio communication terminal apparatuses in an order reverse to the order of the respective reception radio field intensities (i.e., the increasing order) after classifying or separating them according to the respective processing types mentioned above.

When a determination result of Step 907 is NO, the personal computer apparatus PC determines in Step 911 whether or not to carry out the display in the decreasing order.

When a determination result of Step 911 is YES, the personal computer apparatus PC displays the printer apparatuses PP1 through PPn or the radio communication terminal apparatuses in the order of the respective reception radio field intensities in Step 912.

When a determination result of Step 911 is NO, the personal computer apparatus PC displays the printer apparatuses PP1 through PPn or the radio communication terminal apparatuses in an order reverse to the order of the respective reception radio field intensities (i.e., the increasing order) in Step 913.

Figure 14:
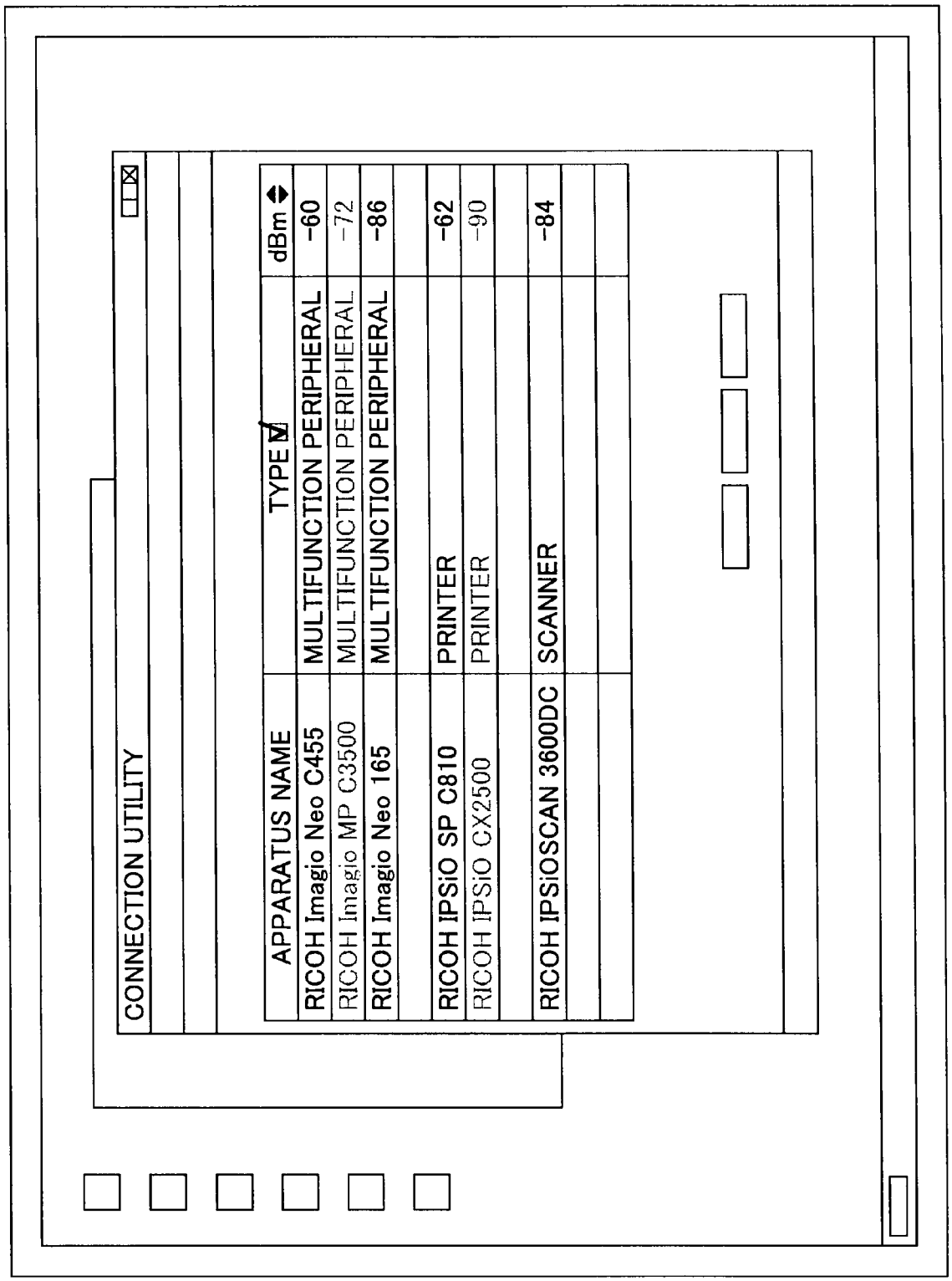
FIG. 14 shows one example of display of radio communication terminal apparatuses in an order from one having a higher radio field intensity.

FIG. 14 shows an example of displaying the printer apparatuses PP1 through PPn or the radio communication terminal apparatuses carried out in each of Step 107 of FIG. 4, Step 602 of FIG. 9, Step 702 of FIG. 10, Step 813 of FIG. 12 and Step 909 of FIG. 13. Such a manner of display is carried out on the CRT screen display device 11 shown in FIG. 2.

In the example of FIG. 14, identification information (i.e., 'apparatus names') of total 6 radio communication terminal apparatuses are arranged according to respective reception radio field intensities (i.e., dBm) concerning communication with the radio communication terminal apparatuses, after they are classified or separated according to their processing types.

That is, on lines 1 through 3, identification information of three multifunction peripherals, a processing type of which is 'multifunction peripheral', i.e., RICOH Imagio Neo C455, RICOH Imagio MP C3500 and RICOH Imagio Neo 165, are displayed, as shown in FIG. 14. Further, the respective reception radio field intensities are also displayed as −60, −72 and −86 [dBm] on the corresponding lines. Thus, on lines 1 through 3, the radio communication terminal apparatuses of the processing type 'multifunction peripheral' are arranged in the decreasing order of the respective reception radio field intensities.

Similarly, on lines 5 and 6, with one blank line inserted thereabove, identification information of two printer apparatuses, a processing type of which is 'printer', i.e., RICOH IPSiO SP C810 and RICOH IPSiO CX2500, are displayed, as shown in FIG. 14. Further, the respective reception radio field intensities are also displayed as −62 and −90 [dBm] on the corresponding lines. Thus, on lines 5 and 6, the radio communication terminal apparatuses of the processing type 'printer' are arranged in the decreasing order of the respective reception radio field intensities.

Further, on line 8 with one blank line inserted thereabove, identification information of a scanner apparatuses, a processing type of which is 'scanner', i.e., RICOH IPSiO SCAN 3600D, is displayed, as shown in FIG. 14. Further, the reception radio field intensity is also displayed as −84 [dBm] on the corresponding line.

Thus, in the example of FIG. 14, display is made in such a manner that the radio communication terminal apparatuses are classified or separated by their processing types, i.e., the lines 1-3 correspond to the processing type 'multifunction peripheral', the lines 5-6 correspond to the processing type 'printer', and the line 8 corresponds to the processing type 'scanner'. In other words, as shown in FIG. 14, the total six radio communication terminal apparatuses, RICOH Imagio Neo C455, RICOH Imagio MP C3500, RICOH Imagio Neo 165, RICOH IPSiO SP C810, RICOH IPSiO CX2500 and RICOH IPSiO SCAN 3600D, are displayed in such a manner that they are classified or separated according to their processing types.

In FIG. 14, when a user carries out operation to the personal computer apparatus PC to check a check box of the 'type' space of the table shown, the six radio communication terminal apparatuses are displayed in the classified manner as describe above as shown. However, when the user operates the personal computer apparatus PC to remove the check mark from the check box, these six radio communication terminal apparatuses are displayed in the order truly according to the order of the respective reception radio field intensities [dBm] without being classified or separated according to their processing types.

Further, in FIG. 14, when the user carries out operation to the personal computer apparatus PC to click a mark ▲ (i.e., a triangle having its vertex indicating upward), display in the increasing order (the order of display reverse to that actually shown in FIG. 14) is provided. Similarly, when the user carries out operation to the personal computer apparatus PC to click a mark ▼ (i.e., a triangle having its vertex indicating downward), display in the decreasing order (the order of display actually shown in FIG. 14) is provided. Thus, the user can freely switch the displaying manner between the increasing order and the decreasing order.

Further, in FIG. 14, the display of the lines 2 and 6 (i.e., RICOH Imagio MP C3500 and RICOH IPSiO CX2500) is made with gray color, as can be seen. This manner of display corresponds to the above-mentioned manner of being grayed out. This means that the corresponding radio communication terminal apparatuses, i.e., the multifunction peripheral, RICOH Imagio MP C3500 and the printer, RICOH IPSiO CX2500 are already used by another user. In such a situation, as a result of the corresponding display being thus grayed out, the user is noticed that these radio communication terminal apparatuses, i.e., the multifunction peripheral RICOH Imagio MP C3500 and the printer RICOH IPSiO CX2500 are not allowed to select.

It is noted that, in the above-described embodiments, description has been made such that the peer-to-peer communication mode of the radio LAN is used for communication between the personal computer apparatus and the printer apparatuses. However, the present invention may be applied also to a case where the well-known 'infrastructure mode' is applied such that an access point of a radio LAN is used as a relay point.

Further, the present invention may be applied, in the same manner, also to a case where radio communication for a relatively short distance use, other than a radio LAN, for example, so-called PAN (personal area network) such as Wireless USB, Bluetooth, or such, is applied.

The present invention is not limited to the specifically disclosed embodiments, and variations and modifications may be made without departing from the scope of the present invention.

The present application is based on Japanese priority applications Nos. 2007-032104 and 2007-306420, filed Feb. 13, 2007 and Nov. 27, 2007, the entire contents of which are hereby incorporated herein by reference.

What is claimed is:

1. A radio communication terminal apparatus of a plurality of radio communication terminal apparatuses in a radio communication network system having the plurality of radio communication terminal apparatuses each having a radio communication function, comprising:

an obtaining part configured to obtain identification information of another radio communication terminal apparatus of said plurality of radio communication terminal apparatuses;

a measuring part configured to measure radio field intensities of radio waves directly emitted from another radio communication terminal apparatus of said plurality of radio communication terminal apparatuses;

a storing part configured to store measurement values of the radio field intensities of the radio waves directly emitted from the another radio communication terminal apparatus, obtained from the measurement of the measuring part;

a determination part configured to determine whether identification information and radio field intensities have been determined for each of the other plurality of radio communication terminal apparatuses; and a display screen for displaying each of the other plurality of radio communication terminal apparatuses to a user, wherein:

when the determination part determines that identification information and radio field intensities have not been determined for each of the other plurality radio communication terminal apparatuses, identification information and radio field intensities are obtained from another radio communication terminal apparatus of the plurality of radio communication terminal apparatuses until identification information and radio field intensities have been determined for each of the other plurality of radio communication terminal apparatuses, on the display screen, the identification information of each of the other plurality of radio communication terminal apparatuses is arranged in an increasing order or a decreasing order based on the values of the radio field intensities of the radio waves directly emitted from each of the other plurality of radio communication terminal apparatuses stored by the storing part, and the radio communication terminal apparatus is configured to automatically disconnect a connection with one of the other plurality of radio communication apparatuses selected by the user when there is no communication therebetween for more than a predetermined time.

2. The radio communication terminal apparatus as claimed in claim 1, wherein:

said other plurality of radio communication terminal apparatuses have respective printing functions, when a user carries out operation to select a printing function, the other plurality of radio communication terminal apparatuses are displayed on the display screen, and when the user carries out operation to select any radio communication terminal apparatus of the other plurality of radio communication terminal apparatuses, said radio communication terminal apparatus establishes communication with the thus-selected radio communication terminal apparatus.

3. The radio communication terminal apparatus as claimed in claim 1, wherein:

said other plurality of radio communication terminal apparatuses have respective printing functions, the other plurality of radio communication terminal apparatuses are displayed on the display screen, and when the user carries out operation to select any radio communication terminal apparatus of the other plurality of radio communication terminal apparatuses thus displayed on the display screen, said radio communication terminal apparatus establishes communication with the thus-selected radio communication terminal apparatus.

4. The radio communication terminal apparatus as claimed in claim 1, wherein:

when the other plurality of radio communication terminal apparatuses are displayed on the display screen, at least one radio communication terminal apparatus thereof is displayed in such a manner to indicate that said at least one radio communication terminal apparatus cannot be selected by the user.

5. The radio communication terminal apparatus as claimed in claim 1, wherein:

when the other plurality of radio communication terminal apparatuses are displayed on the display screen, said other plurality of radio communication terminal apparatuses are classified according to their respective types, and, for each type, the identification information of said other plurality of radio communication terminal apparatuses is arranged in an increasing order or a decreasing order with the use of the measurement values of the radio field intensities of radio communication with said other plurality of radio communication terminal apparatuses stored by the storing part as keys for the arrangement.

6. The radio communication terminal apparatus as claimed in claim 1, wherein:

when the other plurality of radio communication terminal apparatuses are displayed on the display screen, they are displayed in such a manner to indicate that any radio communication terminal apparatus of the other plurality of radio communication terminal apparatuses can be selected by the user.

7. The radio communication terminal apparatus as claimed in claim 1, further comprising:

a part configured to transmit, when any radio communication terminal apparatus is selected from among the other plurality of radio communication terminal apparatuses displayed on the display screen, a packet requesting a visual response, to the thus-selected radio communication terminal apparatus, wherein:

said other plurality of radio communication terminal apparatuses have parts configured to receive the packet requesting a visual response, and parts configured to make the visual response to the request made by the packet.

8. The radio communication terminal apparatus as claimed in claim 1, further comprising:

a part configured to transmit, when any radio communication terminal apparatus is selected from among the other plurality of radio communication terminal apparatuses displayed on the display screen, a packet requesting an audible response, to the thus-selected radio communication terminal apparatus, wherein:

said other plurality of radio communication terminal apparatuses have parts configured to receive the packet requesting an audible response, and parts configured to make the audible response to the request made by the packet.

9. The radio communication terminal apparatus as claimed in claim 1, further comprising:

a timer configured to measure a time;

a part configured to start time measurement operation of the timer when connection by the radio communication network with one radio communication terminal apparatus of the plurality of radio communication terminal apparatuses is established;

a part configured to detect that data communication occurs during the connection by the radio communication network, to stop the time measurement operation of the timer;

a part configured to detect that a series of data communication occurs during the connection by the radio communication network, to start time measurement operation of the timer; and a part configured to detect that the measured time has reached a predetermined time as a result of the time measurement operation of the timer, to break the connection by the radio communication network.

10. A display method in a radio communication terminal apparatus of a plurality of radio communication terminal apparatuses in a radio communication network system having the plurality of radio communication terminal apparatuses each having a radio communication function, comprising the steps of:

obtaining identification of another radio communication terminal apparatus of the plurality of radio communication terminal apparatuses;

measuring radio field intensities of radio waves directly emitted from another radio communication terminal apparatus of the plurality of radio communication terminal apparatuses;

storing measurement values of the radio field intensities of the radio waves directly emitted from the another radio communication terminal apparatus of the plurality of radio communication terminal apparatuses, obtained from the measurement in the measuring step;

determining whether identification information and radio field intensities have been determined for each of the other plurality of radio communication terminal apparatuses;

performing, when it is determined in the determination step that identification information and radio field intensities have not been determined for each of the other plurality radio communication terminal apparatuses, the obtaining step and measuring step until identification information and radio field intensities have been determined for each of the other plurality of radio communication terminal apparatuses;

displaying, on a display screen for displaying each of the other plurality of radio communication terminal apparatuses to a user, identification information of each of the other plurality of radio communication terminal apparatuses in such a manner to arrange in an increasing order or a decreasing order based on the values of the radio field intensities of the radio waves directly emitted from each of the other plurality of radio communication terminal apparatuses stored in the storing step; and automatically disconnecting a connection with one of the said other plurality of radio communication apparatuses selected by the user when there is no communication therebetween for more than a predetermined time.

11. The display method in the radio communication terminal apparatus as claimed in claim 10, wherein:

said other plurality of radio communication terminal apparatuses have respective printing functions, when a user carries out operation to said one radio communication terminal apparatus to select a printing function, said one radio communication terminal apparatus displays the other plurality of radio communication terminal apparatuses on the display screen, and when the user carries out operation to said one radio communication terminal apparatus to select any radio communication terminal apparatus of the other plurality of radio communication terminal apparatuses, said one radio communication terminal apparatus establishes communication with the thus-selected radio communication terminal apparatus.

12. The display method in the radio communication terminal apparatus as claimed in claim 10, wherein:

said other plurality of radio communication terminal apparatuses have respective printing functions, the other plurality of radio communication terminal apparatuses are displayed on the display screen of said one radio communication terminal apparatus, and when the user carries out operation to said one radio communication terminal apparatus to select any radio communication terminal apparatus of the other plurality of radio communication terminal apparatuses thus displayed on the display screen, said one radio communication terminal apparatus establishes communication with the thus-selected radio communication terminal apparatus.

13. The display method in the radio communication terminal apparatus as claimed in claim 10, wherein:

when the other plurality of radio communication terminal apparatuses are displayed on the display screen of said one radio communication terminal apparatus, at least one radio communication terminal apparatus thereof is displayed in such a manner to indicate that said at least one radio communication terminal apparatus cannot be selected by the user.

14. A non-transitory computer-readable medium storing computer readable instructions thereon that when executed by a radio communication terminal apparatus of a plurality of radio communication terminal apparatuses in a radio communication network system having the plurality of radio communication terminal apparatuses each having a radio communication function, cause the radio communication terminal apparatus to perform a method comprising:

obtaining identification of another radio communication terminal apparatus of the plurality of radio communication terminal apparatuses;

measuring radio field intensities of radio waves directly emitted from another radio communication terminal apparatus of said plurality of radio communication terminal apparatuses;

storing measurement values of the radio field intensities of the radio waves directly emitted from the another radio communication terminal apparatuses, obtained from the measurement of the measuring step;

determining whether identification information and radio field intensities have been determined for each of the other plurality of radio communication terminal apparatuses;

performing, when it is determined in the determination step that identification information and radio field intensities have not been determined for each of the other plurality radio communication terminal apparatuses, the obtaining step and measuring step until identification information and radio field intensities have been determined for each of the other plurality of radio communication terminal apparatuses;

displaying, on a display screen of said one radio communication terminal apparatus for displaying each of the other plurality of radio communication terminal apparatuses to a user, identification information of each of the other plurality of radio communication terminal apparatuses in such a manner to arrange in an increasing order or a decreasing order based on the values of the radio field intensities of the radio waves directly emitted from each of the other plurality of radio communication terminal apparatuses stored by the storing step; and automatically disconnecting a connection with one of the said other plurality of radio communication apparatuses selected by the user when there is no communication therebetween for more than a predetermined time.

15. The non-transitory computer-readable medium as claimed in claim 14, wherein:

said other plurality of radio communication terminal apparatuses have respective printing functions, when a user carries out operation to said one radio communication terminal apparatus to select a printing function, said displaying displays the other plurality of radio communication terminal apparatuses on the display screen, and said program further causes the computer to function as communication establishing means for establishing, when the user carries out operation to said one radio communication terminal apparatus to select any radio communication terminal apparatus of the other plurality of radio communication terminal apparatuses, communication with the thus-selected radio communication terminal apparatus.

16. The non-transitory computer-readable medium as claimed in claim 14, wherein:

said other plurality of radio communication terminal apparatuses have respective printing functions, said displaying displays the other plurality of radio communication terminal apparatuses on the display screen of said one radio communication terminal apparatus, and said program further causes the computer to function as communication establishing means for establishing, when the user carries out operation to said one radio communication terminal apparatus to select any radio communication terminal apparatus of the other plurality of radio communication terminal apparatuses thus displayed on the display screen, communication with the thus-selected radio communication terminal apparatus.

17. The non-transitory computer-readable medium as claimed in claim 14, wherein:
- when the other plurality of radio communication terminal apparatuses are displayed on the display screen, said displaying displays at least one radio communication terminal apparatus thereof in such a manner to indicate that said at least one radio communication terminal apparatus cannot be selected by the user.

18. A radio communication network system comprising:
- a plurality of radio communication terminal apparatuses each having a radio communication function,
- wherein each of said plurality of radio communication terminal apparatuses includes the radio communication terminal apparatus claimed in claim 1.

* * * * *